(12) United States Patent
Barnum

(10) Patent No.: US 8,831,337 B2
(45) Date of Patent: Sep. 9, 2014

(54) METHOD, SYSTEM AND COMPUTER PROGRAM PRODUCT FOR IDENTIFYING LOCATIONS OF DETECTED OBJECTS

(71) Applicant: Texas Instruments Incorporated, Dallas, TX (US)

(72) Inventor: Peter Barnum, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 175 days.

(21) Appl. No.: 13/675,467

(22) Filed: Nov. 13, 2012

(65) Prior Publication Data

US 2013/0121562 A1 May 16, 2013

Related U.S. Application Data

(60) Provisional application No. 61/558,569, filed on Nov. 11, 2011.

(51) Int. Cl.
*G06K 9/00* (2006.01)
*G06T 7/00* (2006.01)
*G06K 9/46* (2006.01)

(52) U.S. Cl.
CPC ............ *G06T 7/0075* (2013.01); *G06T 7/0081* (2013.01); *G06T 2207/10028* (2013.01); *G06K 9/46* (2013.01); *G60K 9/00201* (2013.01)
USPC ........... 382/154; 382/278; 382/282; 382/284; 345/419; 345/423

(58) Field of Classification Search
USPC ................ 382/154, 174, 175, 278, 282, 284; 345/419, 423
See application file for complete search history.

(56) References Cited

U.S. PATENT DOCUMENTS

| | | | |
|---|---|---|---|
| 8,654,130 B2 * | 2/2014 | Ostermann .................... 345/473 |
| 8,655,093 B2 * | 2/2014 | El Dokor et al. ............. 382/254 |
| 8,711,206 B2 * | 4/2014 | Newcombe et al. ............ 348/46 |
| 8,718,326 B2 * | 5/2014 | Yoon et al. .................... 382/103 |
| 8,718,405 B2 * | 5/2014 | Fujiki et al. ................... 382/294 |

* cited by examiner

*Primary Examiner* — Yosef Kassa
(74) *Attorney, Agent, or Firm* — Michael A. Davis, Jr.; Frederick J. Telecky, Jr.

(57) ABSTRACT

First and second objects are detected within an image. The first object includes first pixel columns, and the second object includes second pixel columns. A rightmost one of the first pixel columns is adjacent to a leftmost one of the second pixel columns. A first equation is fitted to respective depths of the first pixel columns, and a first depth is computed of the rightmost one of the first pixel columns in response to the first equation. A second equation is fitted to respective depths of the second pixel columns, and a second depth is computed of the leftmost one of the second pixel columns in response to the second equation. The first and second objects are merged in response to the first and second depths being sufficiently similar to one another, and in response to the first and second equations being sufficiently similar to one another.

30 Claims, 19 Drawing Sheets

METHOD, SYSTEM AND COMPUTER PROGRAM PRODUCT FOR IDENTIFYING LOCATIONS OF DETECTED OBJECTS

CROSS-REFERENCE TO RELATED APPLICATIONS

This application claims priority to U.S. Provisional Patent Application Ser. No. 61/558,569, filed Nov. 11, 2011, entitled Depth-Based Obstacle Detection, naming Peter Charles Barnum as inventor.

This application is related to co-owned co-pending U.S. patent application Ser. No. 13/675,441, filed on even date herewith, entitled METHOD, SYSTEM AND COMPUTER PROGRAM PRODUCT FOR DETECTING AN OBJECT IN RESPONSE TO DEPTH INFORMATION, naming Peter Charles Barnum as inventor.

All of the above-identified applications are hereby fully incorporated herein by reference for all purposes.

BACKGROUND

The disclosures herein relate in general to image processing, and in particular to a method, system and computer program product for identifying locations of detected objects.

Depth information is useful for detecting an object within an image. Such detection enables certain types of machine vision operations. Some previous techniques have been developed to perform such detection, but those techniques can suffer from computational inefficiency, unreliability if the image has imperfections (e.g., noisy and/or missing pixels), and/or insufficient accuracy.

SUMMARY

In a first example, a first object is detected within an image. The first object includes pixel columns. An equation is fitted to respective depths of the pixel columns. In response to determining that a fit is insufficient between the equation and more than a threshold number of the respective depths of consecutive pixel columns, the first object is split into at least second and third objects. The second object includes the consecutive pixel columns.

In a second example, first and second objects are detected within an image. The first object includes first pixel columns, and the second object includes second pixel columns. A rightmost one of the first pixel columns is adjacent to a leftmost one of the second pixel columns. A first equation is fitted to respective depths of the first pixel columns, and a first depth is computed of the rightmost one of the first pixel columns in response to the first equation. A second equation is fitted to respective depths of the second pixel columns, and a second depth is computed of the leftmost one of the second pixel columns in response to the second equation. The first and second objects are merged in response to the first and second depths being sufficiently similar to one another, and in response to the first and second equations being sufficiently similar to one another.

DETAILED DESCRIPTION

Figure 1:
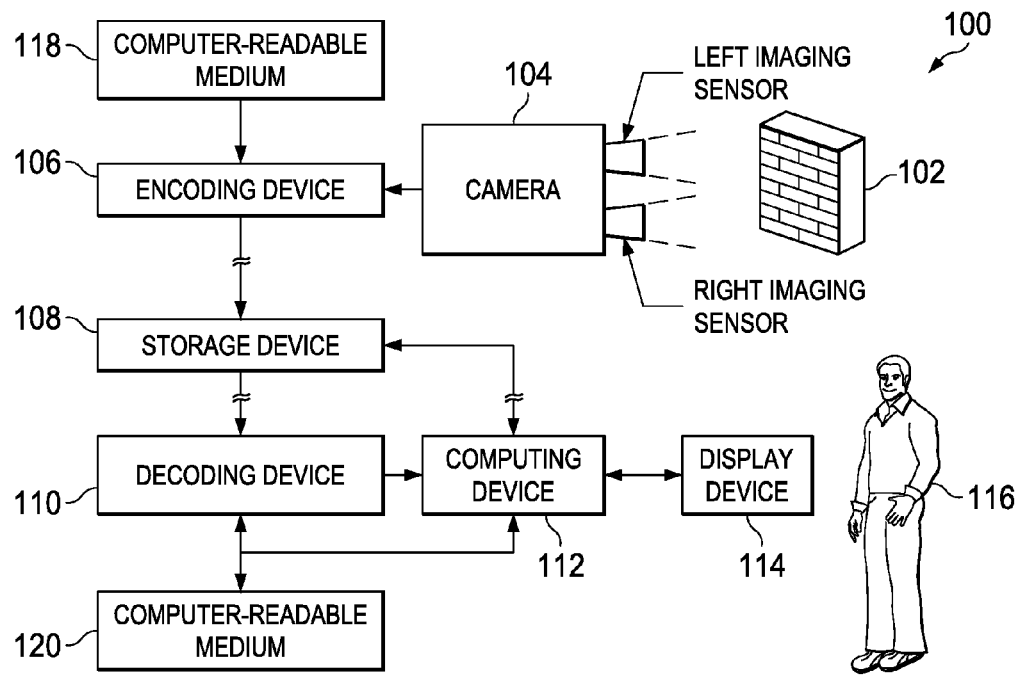
FIG. 1 is a block diagram of an information handling system of the illustrative embodiments.

FIG. 1 is a block diagram of an information handling system (e.g., one or more computers and/or other electronics devices, such as battery-powered mobile smartphones), indicated generally at 100, of the illustrative embodiments. In the example of FIG. 1, a scene (e.g., including a physical object 102 and its surrounding foreground and background) is viewed by a camera 104, which: (a) captures and digitizes images of such views; and (b) outputs a video sequence of such digitized (or "digital") images to an encoding device 106. As shown in the example of FIG. 1, the camera 104 is a stereoscopic camera that includes dual imaging sensors, which are spaced apart from one another, namely: (a) a first imaging sensor for capturing, digitizing and outputting (to the encoding device 106) a first image of a view for a human's left eye; and (b) a second imaging sensor for capturing, digitizing and outputting (to the encoding device 106) a second image of a view for the human's right eye. In another embodiment, the camera 104 is a light detection and ranging ("LIDAR") system.

The encoding device 106: (a) receives the video sequence from the camera 104; (b) encodes the video sequence into a binary logic bit stream; and (c) outputs the bit stream to a storage device 108, which receives and stores the bit stream. A decoding device 110: (a) reads the bit stream from the storage device 108; (b) in response thereto, decodes the bit stream into the video sequence; and (c) outputs the video sequence to a computing device 112.

The computing device 112: (a) receives the video sequence from the decoding device 110 (e.g., automatically, or in response to a command from a display device 114, such as a command that a user 116 specifies via a touchscreen of the display device 114); and (b) optionally, outputs the video sequence to the display device 114 for display to the user 116. Also, the computing device 112 automatically: (a) performs various operations for detecting objects (e.g., obstacles) and for identifying their respective locations (e.g., estimated coordinates, sizes and orientations) within the video sequence's images, so that results (e.g., locations of detected objects) of such operations are optionally displayable (e.g., within such images) to the user 116 by the display device 114; and (b) writes such results for storage into the storage device 108.

Optionally, the display device 114: (a) receives the video sequence and such results from the computing device 112 (e.g., automatically, or in response to a command that the user 116 specifies via the touchscreen of the display device 114); and (b) in response thereto, displays the video sequence (e.g., stereoscopic images of the object 102 and its surrounding foreground and background) and such results, which are viewable by the user 116 (e.g., with 3D effect). The display device 114 is any suitable display device that includes a display screen whose optical components enable viewing by the user 116, such as a suitable plasma display screen, liquid crystal display ("LCD") screen, or light emitting diode ("LED") display screen. In one example, the display device 114 displays a stereoscopic image with three-dimensional ("3D") effect for viewing by the user 116 through special glasses that: (a) filter the first image against being seen by the right eye of the user 116; and (b) filter the second image against being seen by the left eye of the user 116. In another example, the display device 114 displays the stereoscopic image with 3D effect for viewing by the user 116 without relying on special glasses.

The encoding device 106 performs its operations in response to instructions of computer-readable programs, which are stored on a computer-readable medium 118 (e.g., hard disk drive, nonvolatile flash memory card, and/or other storage device). Also, the computer-readable medium 118 stores a database of information for operations of the encoding device 106. Similarly, the decoding device 110 and the computing device 112 perform their operations in response to instructions of computer-readable programs, which are stored on a computer-readable medium 120. Also, the computer-readable medium 120 stores a database of information for operations of the decoding device 110 and the computing device 112.

The system 100 includes various electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs"). In one embodiment: (a) a first electronics device includes the camera 104, the encoding device 106, and the computer-readable medium 118, which are housed integrally with one another; and (b) a second electronics device includes the decoding device 110, the computing device 112, the display device 114 and the computer-readable medium 120, which are housed integrally with one another.

In an alternative embodiment: (a) the encoding device 106 outputs the bit stream directly to the decoding device 110 via a network, such as a mobile (e.g., cellular) telephone network, a landline telephone network, and/or a computer network (e.g., Ethernet, Internet or intranet); and (b) accordingly, the decoding device 110 receives and processes the bit stream directly from the encoding device 106 substantially in real-time. In such alternative embodiment, the storage device 108 either: (a) concurrently receives (in parallel with the decoding device 110) and stores the bit stream from the encoding device 106; or (b) is absent from the system 100.

Figure 2:
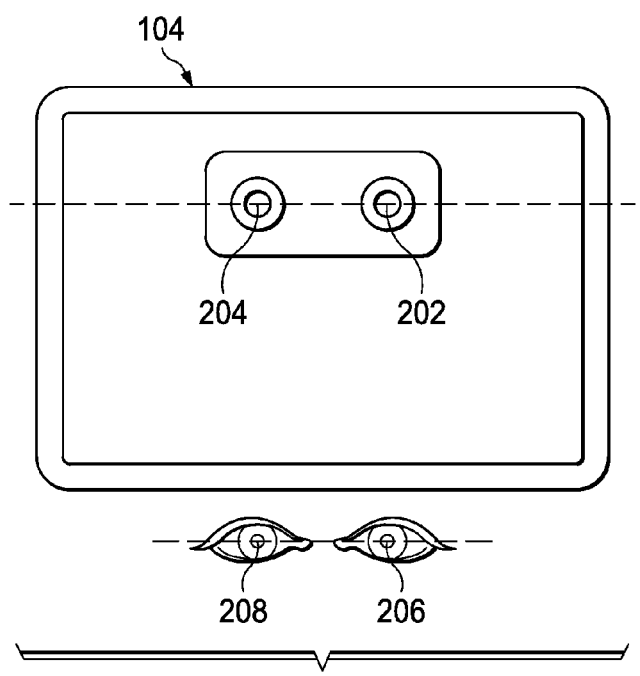
FIG. 2 is a diagram of an example orientation of dual imaging sensors of a camera of FIG. 1.

FIG. 2 is a diagram of an example orientation of the dual imaging sensors 202 and 204 (of the camera 104), in which a line between the sensors 202 and 204 is substantially parallel to a line between eyes 206 and 208 of the user 116. In this example, while the sensors 202 and 204 have such orientation, the camera 104 captures and digitizes images with a landscape aspect ratio.

Figure 3:
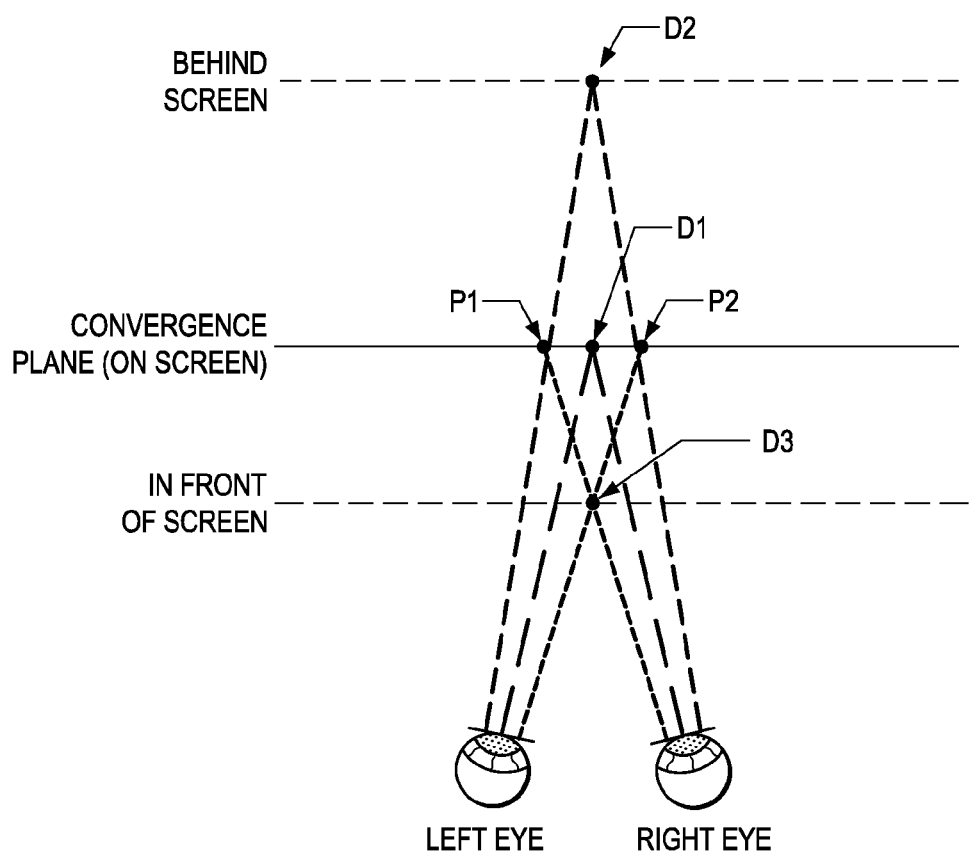
FIG. 3 is a diagram of viewing axes of a human's left and right eyes.

FIG. 3 is a diagram of viewing axes of the left and right eyes of the user 116. In the example of FIG. 3, a stereoscopic image is displayable by the display device 114 on a screen (which is a convergence plane where viewing axes of the left and right eyes naturally converge to intersect). The user 116 experiences the 3D effect by viewing the stereoscopic image on the display device 114, so that various features (e.g., objects) appear on the screen (e.g., at a point D1), behind the screen (e.g., at a point D2), and/or in front of the screen (e.g., at a point D3).

Within the stereoscopic image, a feature's disparity is a horizontal shift between: (a) such feature's location within the first image; and (b) such feature's corresponding location within the second image. A limit of such disparity is dependent on the camera 104. For example, if a feature (within the stereoscopic image) is centered at the point D1 within the first image, and likewise centered at the point D1 within the second image, then: (a) such feature's disparity=D1−D1=0; and (b) the user 116 will perceive the feature to appear at the point D1 on the screen, which is a natural convergence distance away from the left and right eyes.

By comparison, if the feature is centered at a point P1 within the first image, and centered at a point P2 within the second image, then: (a) such feature's disparity=P2−P1 will be positive; and (b) the user 116 will perceive the feature to appear at the point D2 behind the screen, which is greater than the natural convergence distance away from the left and right eyes. Conversely, if the feature is centered at the point P2 within the first image, and centered at the point P1 within the second image, then: (a) such feature's disparity=P1−P2 will be negative; and (b) the user 116 will perceive the feature to appear at the point D3 in front of the screen, which is less than the natural convergence distance away from the left and right eyes. The amount of the feature's disparity (e.g., horizontal shift of the feature from P1 within the first image to P2 within the second image) is measurable as a number of pixels, so that: (a) positive disparity is represented as a positive number; and (b) negative disparity is represented as a negative number.

Figure 4:
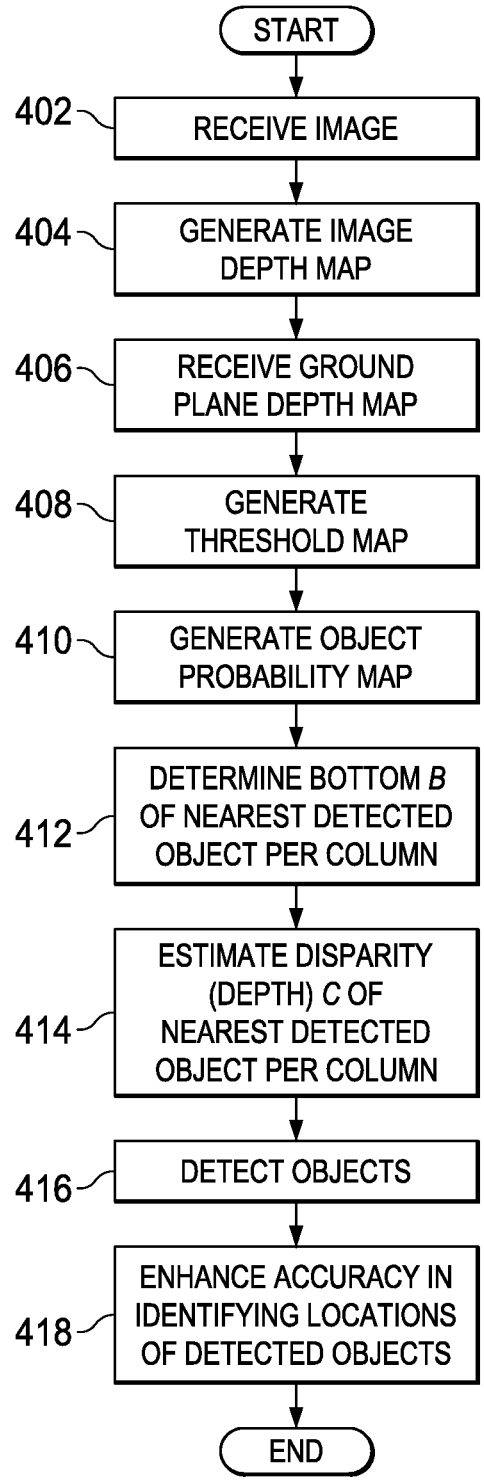
FIG. 4 is a flowchart of various operations that a computing device of FIG. 1 automatically performs for detecting objects and for identifying their respective locations within an image.

FIG. 4 is a flowchart of various operations that the computing device 112 automatically performs for detecting objects and for identifying their respective locations within an image. At a step 402, the computing device 112 receives the image (e.g., a stereoscopic image) from the decoding device 110. At a next step 404, the computing device 112 generates a depth map ("image depth map" or "disparity map") that assigns respective disparity values to pixels of the image (e.g., in response to estimated or measured depths of such pixels), so that a pixel's disparity value is information about (e.g., indicative of) such pixel's depth and vice versa. Optionally, in response to the database of information (e.g., training information) from the computer-readable medium 120, the computing device 112: (a) identifies (e.g., detects and classifies) various low level features (e.g., colors, edges, textures, focus/blur, sizes, gradients, and positions) and high level features (e.g., faces, bodies, sky and foliage) within the image, such as by performing a mean shift clustering operation to segment the image into regions; and (b) computes disparities of such features (between the first image and its associated second image).

For example, in a stereo pair of images (e.g., a stereoscopic image), a feature's depth is proportional to a disparity between such feature's corresponding left and right image pixels, so that such disparity is information about such depth and vice versa. In a first embodiment, the computing device 112 automatically computes such disparities and generates the image depth map in response to those computed disparities, such as by semi-global matching or belief propagation. In a second embodiment, the computing device 112 generates the image depth map in response to direct depth measurements, such as measurements from an active sensor (e.g., range sensor, such as a time-of-flight sensor or a structured-light sensor).

Figure 5A:
FIG. 5A is a first example image from a stereo pair of images.
Figure 5B:
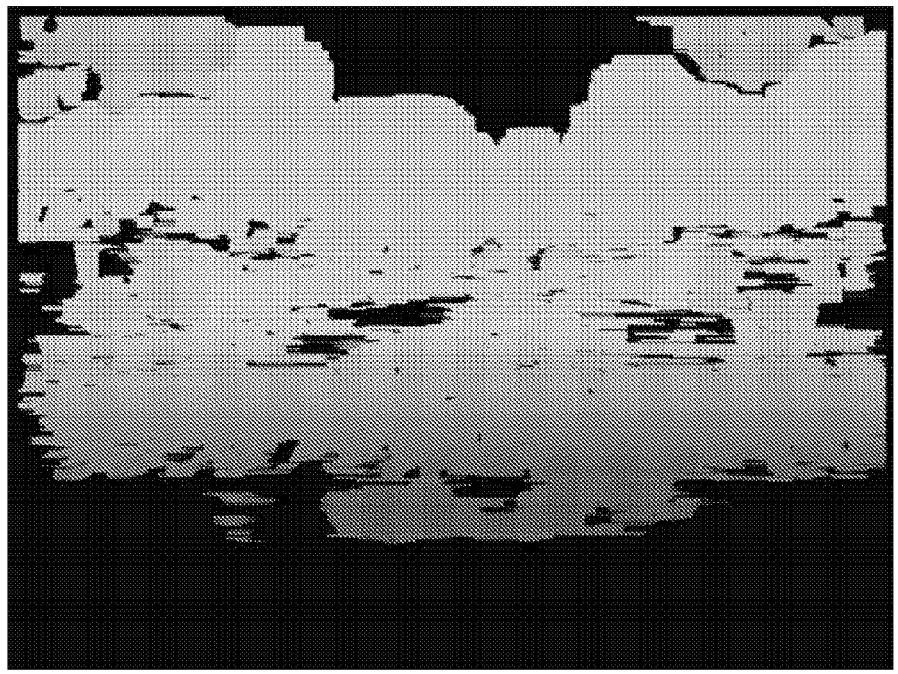
FIG. 5B is an example depth map of the image of FIG. 5A.

FIG. 5A is an example image from a stereo pair of images. FIG. 5B is an example depth map (of that stereo pair), which the computing device 112 generates at the step 404. At a next step 406 (FIG. 4), the computing device 112 receives (e.g., from the computer-readable medium 120) a depth map of a ground plane model's disparities ("ground plane depth map").

Figure 6:
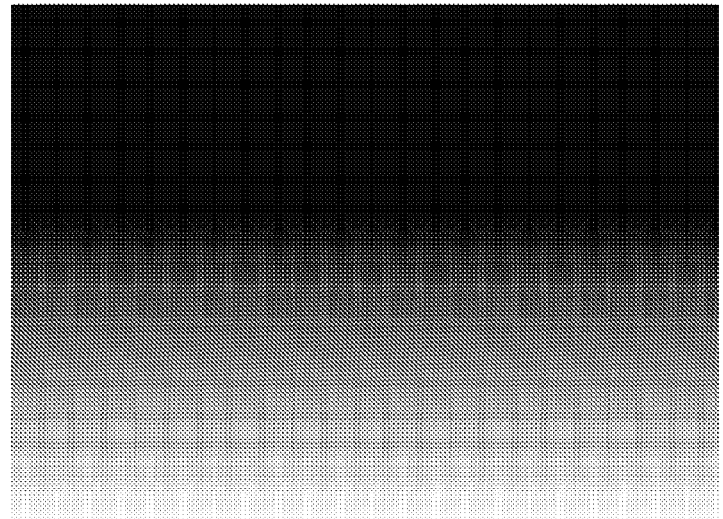
FIG. 6 is an example depth map of a ground plane model's disparities.

FIG. 6 is an example ground plane depth map at various pixels having (x,y) coordinates. In FIG. 6, lighter regions are shallower (e.g., more proximate to the camera 104), and darker regions are deeper (e.g., more distant from the camera 104). A horizon line is the lowest black line in FIG. 6.

In one example ground plane model, the horizon line is modeled as being a straight line (either horizontal or diagonal) that has zero disparity. The ground plane is formed by all pixels below (shallower than) the horizon line. Referring again to FIG. 4, after the step 406, the operation continues to a next step 408.

Figure 7:
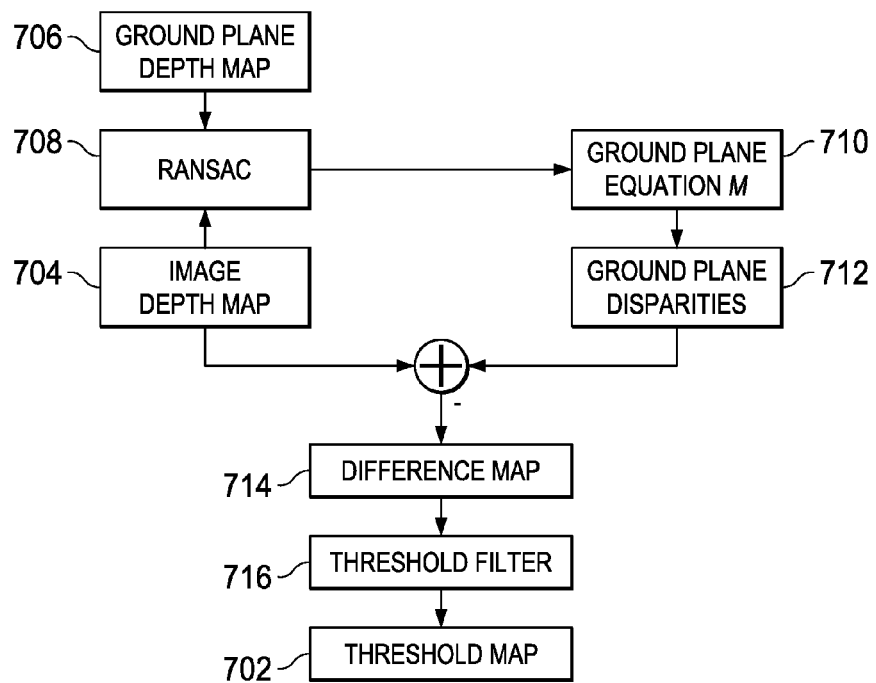
FIG. 7 is an information flow diagram of an operation that the computing device of FIG. 1 automatically performs for generating a threshold map, in response to an image depth map and a ground plane depth map.

FIG. 7 is an information flow diagram of an operation that the computing device 112 automatically performs for generating a threshold map 702 at the step 408 (FIG. 4), in response to the image depth map 704 and the ground plane depth map 706. By performing a random sample consensus ("RANSAC") operation 708, the computing device 112 fits a 3-parameter equation M ("ground plane equation M") 710 to: (a) a down-sampled version (e.g., 80×60 pixels) of the image depth map 704; and (b) the ground plane depth map 706, which has the same resolution as such down-sampled version of the image depth map 704. In response to a pixel's (x,y) coordinate, the computing device 112 uses the ground plane equation M for computing the ground plane's disparity d at such pixel, so that d=Offset+a·x+b·y, where: (a) Offset is the ground plane's disparity at a pixel (0,0), which is a top-left corner of the depth maps 704 and 706; (b) a is a constant per-pixel disparity rate along a horizontal x-axis; and (c) b is a constant per-pixel disparity rate along a vertical y-axis.

For each pixel of a slightly down-sampled version (e.g., 320×240 pixels) of the image depth map 704, the computing device 112 computes: (a) in response to the ground plane equation M, such pixel's respective disparity within the ground plane ("ground plane disparity"); and (b) a difference between such ground plane disparity and such pixel's respective disparity within the image depth map 704. For all of those pixels, the computing device 112 stores (e.g., in the computer-readable medium 120): (a) their respective ground plane disparities 712; and (b) at spatially collocated coordinates within a difference map 714, their respective differences between the ground plane disparities 712 and the image depth map 704. By applying a threshold filter 716 to the difference map 714, the computing device 112 determines whether any one or more of those differences exceeds a threshold.

Accordingly, in response to a pixel's respective difference exceeding the threshold, the computing device 112 marks such pixel (at its spatially collocated coordinate within the threshold map 702) as being a threshold-exceeding pixel. Conversely, in response to such pixel's respective difference being less than or equal to the threshold, the computing device 112 marks such pixel (at its spatially collocated coordinate within the threshold map 702) as being a threshold-compliant pixel. The threshold is programmable or selectable, according to a minimum difference that would be indicative of such pixel's significant protrusion from (e.g., above or below) the ground plane in a particular environment. In that manner, the computing device 112: (a) compares a pixel's respective disparity within the image depth map 704 against such pixel's respective ground plane disparity; and (b) in response to such comparison, generates a marking of such pixel to identify whether such pixel has significant protrusion from the ground plane.

Figure 8:
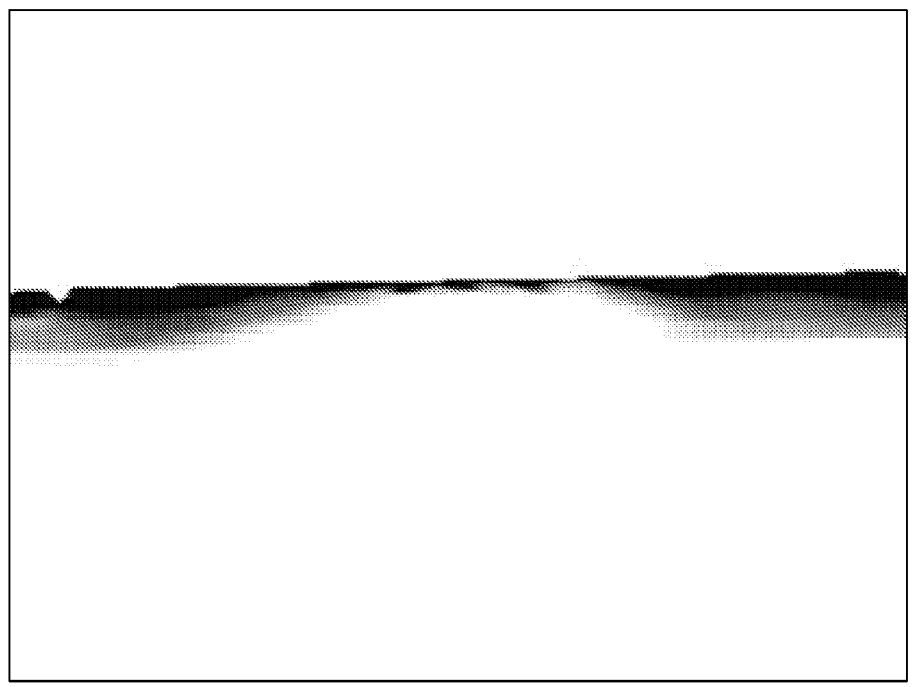
FIG. 8 is an example object probability map.

FIG. 8 is an example object probability map O, which: (a) has the same dimensions as the slightly down-sampled version (e.g., 320×240 pixels) of the image depth map 704 (FIG. 7); and (b) assigns probabilities (on a pixel-by-pixel basis) for such pixels to actually represent one or more objects. In the example of FIG. 8, darker pixels have higher probabilities, so that: (a) black pixels have 100% probability; (b) white pixels have 0% probability; and (c) various shades of grey pixels have intermediate probabilities between 0% and 100%. Referring again to FIG. 4, after the step 408, the operation continues to a next step 410. At the step 410, the computing device 112 generates the object probability map O by computing such probabilities in response to: (a) the threshold map 702 (FIG. 7); and (b) the ground plane disparities 712 (FIG. 7).

Figure 9:
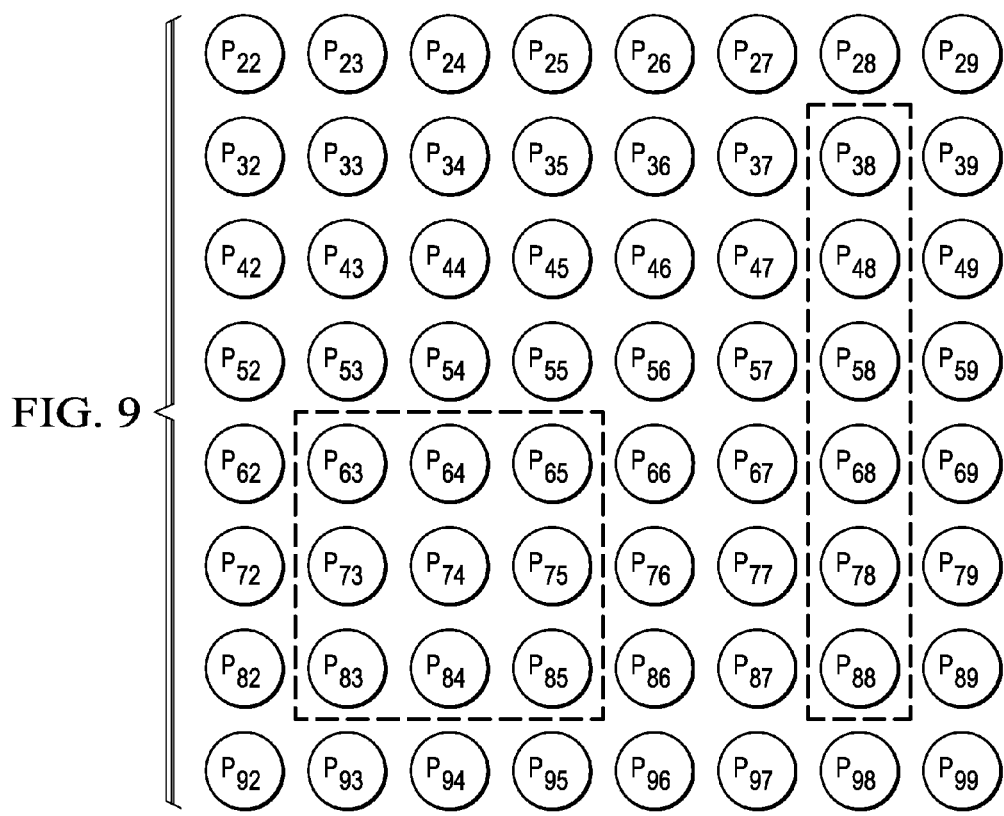
FIG. 9 is a diagram of example pixels within the image depth map.

FIG. 9 is a diagram of example pixels within the slightly down-sampled version (e.g., 320×240 pixels) of the image depth map. In the example of FIG. 9, each pixel $P_{x,y}$ is located within a row x and within a column y of the image depth map, so that such pixel $P_{x,y}$ is located at the (x,y) coordinate within the image depth map. For each pixel within the slightly down-sampled version (e.g., 320×240 pixels) of the image depth map, the computing device 112 generates the object probability map O (e.g., FIG. 8) at the step 410 (FIG. 4).

Figure 10:
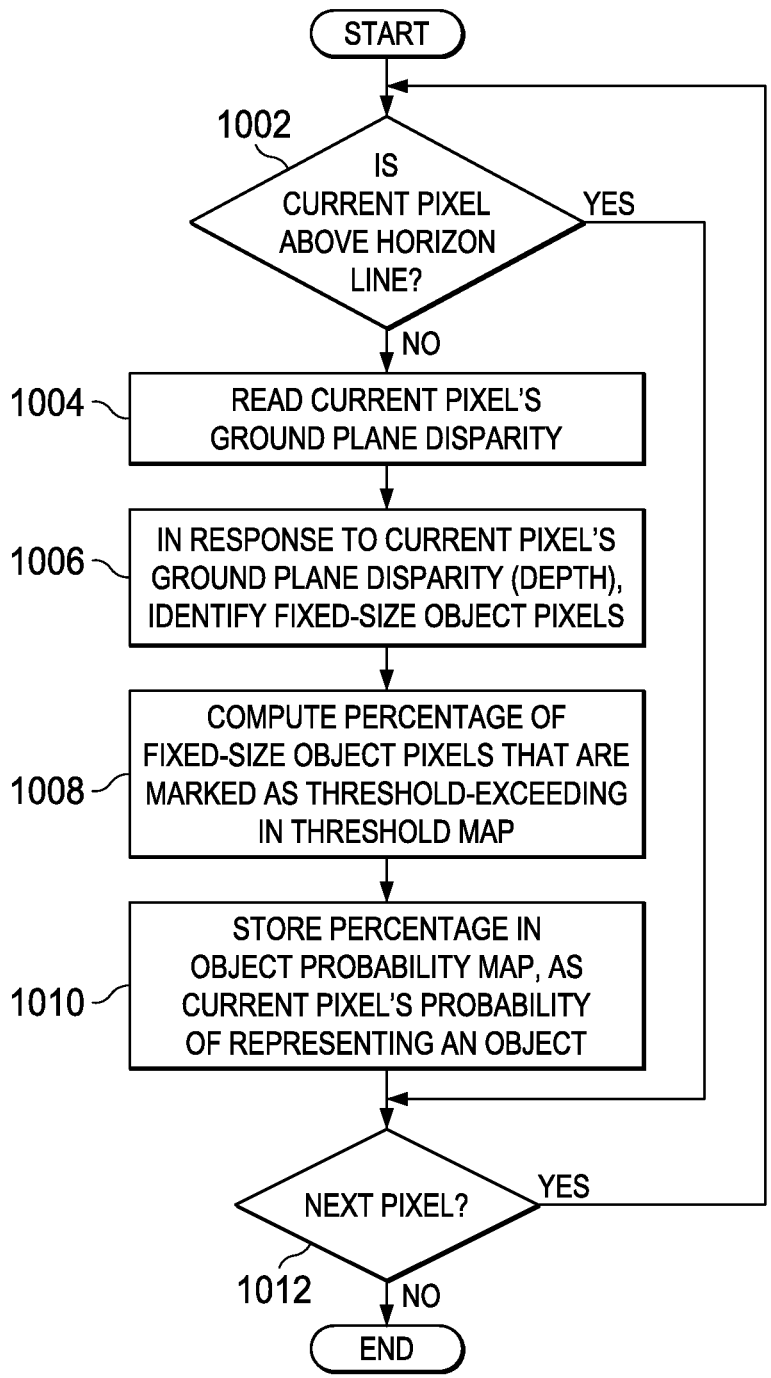
FIG. 10 is a flowchart of an operation that the computing device of FIG. 1 automatically performs for generating the object probability map.

FIG. 10 is a flowchart of the step 410 (FIG. 4) for generating the object probability map O. At a step 1002, the computing device 112 determines whether a representative pixel ("current pixel") is located above the horizon line (FIG. 6). In response to the computing device 112 determining that the current pixel is located at or below the horizon line, the operation continues from the step 1002 to a step 1004, at which the computing device 112 reads the current pixel's respective ground plane disparity from among the stored ground plane disparities 712.

The current pixel's respective ground plane disparity is proportional to the current pixel's respective depth within the ground plane, so that such disparity is information about such depth and vice versa. At a next step 1006, the computing device 112 identifies all pixels ("fixed-size object pixels") that would exist within a representative object ("fixed-size object") that: (a) has the fixed-size (e.g., ½×½ meters) at such depth in a physical universe; and (b) is centered above the current pixel, so that the current pixel is centered within a bottom edge of the fixed-size object. The fixed-size is programmable or selectable, according to a minimum size of objects that are relevant in a particular environment. Together, the fixed-size object pixels form a pixel window ("fixed-size object window").

In the example of FIG. 9, if a pixel $P_{84}$ is the current pixel, then its respective ground plane disparity indicates that the fixed-size object window contains pixels $P_{63}$, $P_{64}$, $P_{65}$, $P_{73}$, $P_{74}$, $P_{75}$, $P_{83}$, $P_{84}$ and $P_{85}$. At a next step 1008, within the fixed-size object window, the computing device 112 computes (e.g., by counting) a percentage of the fixed-size object pixels that are marked as threshold-exceeding pixels in the threshold map 702. At a next step 1010, within the object probability map O, the computing device 112 stores such percentage as the current pixel's respective probability to actually represent an object.

At a next step 1012, the computing device 112 determines whether a next pixel remains to have its respective probability (to actually represent an object) computed and stored within the object probability map O. In response to the computing device 112 determining that a next pixel so remains, the operation returns from the step 1012 to the step 1002, with such next pixel being the current pixel. Conversely, in response to the computing device 112 determining that a next pixel does not so remain, the operation of FIG. 10 ends. Referring again to the step 1002, in response to the computing device 112 determining that the current pixel is located above the horizon line, the operation continues from the step 1002 to the step 1012.

At a particular ground plane disparity, the fixed-size object window's dimensions remain constant to contain a constant number of pixels. For example, if the pixel $P_{85}$ replaces the pixel $P_{84}$ as the current pixel, and if the pixels $P_{84}$ and $P_{85}$ have the same ground plane disparity, then the computing device 112 increases speed of the step 410 by: (a) modifying the fixed-size object window to contain the pixels $P_{66}$, $P_{76}$ and $P_{86}$ instead of the pixels $P_{63}$, $P_{73}$ and $P_{83}$; and (b) within the fixed-size object window, computing a percentage of the pixels $P_{64}$, $P_{65}$, $P_{66}$, $P_{74}$, $P_{75}$, $P_{76}$, $P_{84}$, $P_{85}$ and $P_{86}$ that are marked as threshold-exceeding pixels in the threshold map 702 (e.g., computing by adding to and subtracting from a count of the previous fixed-size object window's pixels that are marked as threshold-exceeding pixels in the threshold map 702). By comparison, if the pixel $P_{85}$ replaces the pixel $P_{84}$ as the current pixel, yet the respective ground plane disparity of the pixel $P_{85}$ indicates that its depth is shallower (e.g., more proximate to the camera 104) than the pixel $P_{84}$, then the fixed-size object window's dimensions become larger to contain more pixels, because the fixed-size object would appear larger within the image at such depth in the physical universe. Conversely, if the pixel $P_{85}$ replaces the pixel $P_{84}$ as the current pixel, yet the respective ground plane disparity of the pixel $P_{85}$ indicates that its depth is deeper (e.g., more distant from the camera 104) than the pixel $P_{84}$, then the fixed-size object window's dimensions become smaller to contain fewer pixels, because the fixed-size object would appear smaller within the image at such depth in the physical universe.

Figure 11:
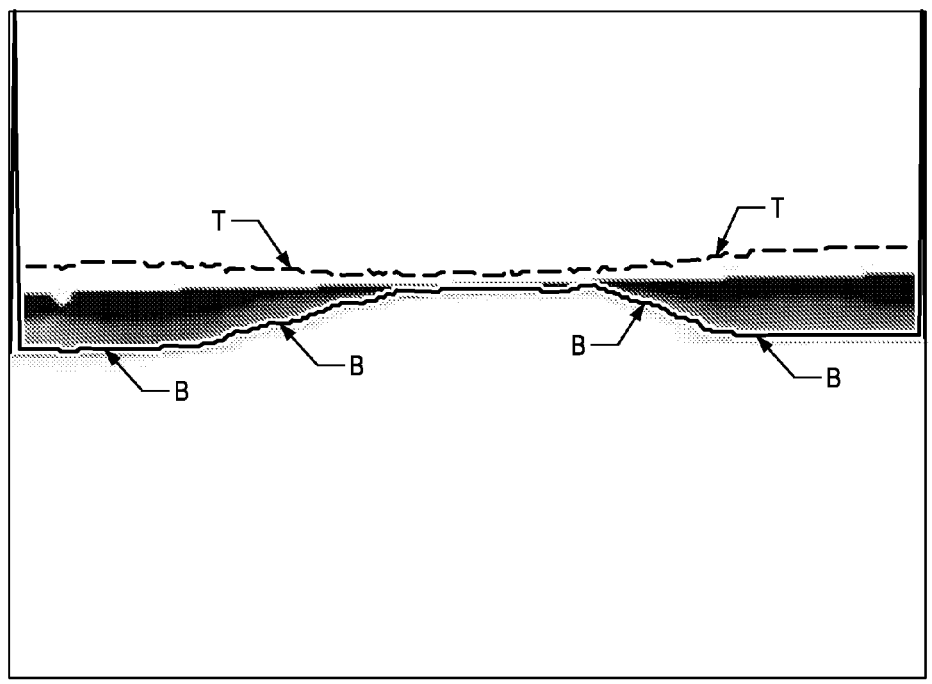
FIG. 11 is the example object probability map of FIG. 8 with additional lines for showing a bottom and top of a nearest detected fixed-height object per column of the image depth map.

FIG. 11 shows a bottom B of a nearest detected object per column of the example object probability map O of FIG. 8. Referring again to FIG. 4, after the step 410, the operation continues to a next step 412. At the step 412, per column of the object probability map O ("current column"), the computing device 112 determines the respective bottom B of such column's nearest detected object. Accordingly, the bottom B is a one-dimensional ("1D") array whose size equals a width of the object probability map O.

Figure 12:
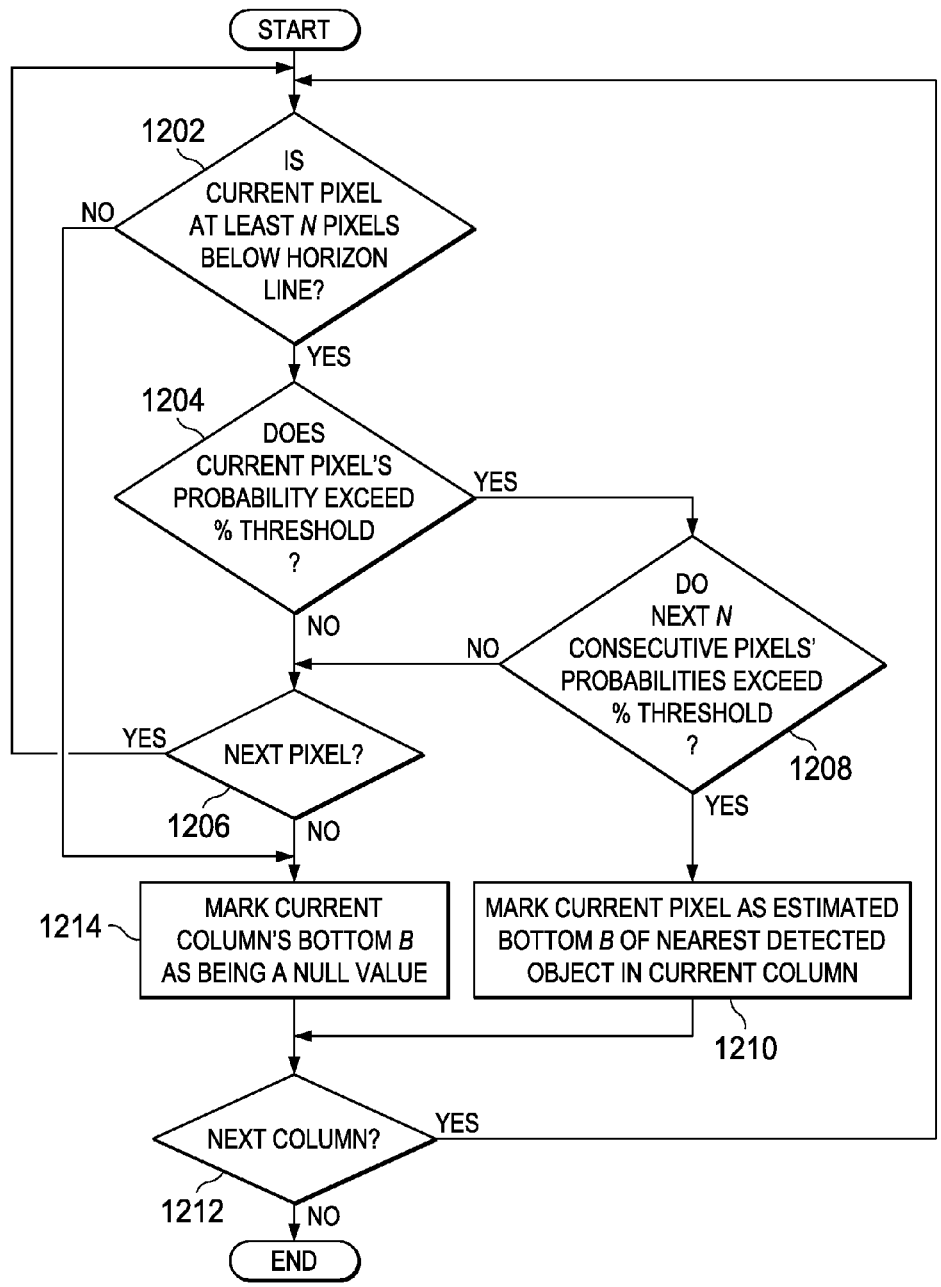
FIG. 12 is a flowchart of an operation that the computing device of FIG. 1 automatically performs for determining the bottom of the nearest detected fixed-height object per column of the image depth map.

FIG. 12 is a flowchart of the step 412 (FIG. 4) for determining the bottom B. For determining the bottom B, the computing device 112 initially reviews the current column's lowest pixel as the current pixel. In the example of FIG. 9, if the current column is the rightmost column (including pixels $P_{29}$, $P_{39}$, $P_{49}$, $P_{59}$, $P_{69}$, $P_{79}$, $P_{89}$ and $P_{99}$), then the pixel $P_{99}$ is the current column's lowest pixel.

At a step 1202, the computing device 112 determines whether the current pixel is located at least a certain integer number N (e.g., 5) pixels below the horizon line (FIG. 6). In response to the computing device 112 determining that the current pixel is located at least N pixels below the horizon line, the operation continues from the step 1202 to a step 1204. At the step 1204, the computing device 112 determines whether the current pixel's respective probability (within the object probability map O) exceeds a percentage threshold (e.g., 20%).

In response to the computing device 112 determining that the current pixel's respective probability (within the object probability map O) fails to exceed the percentage threshold, the operation continues from the step 1204 to a step 1206. At the step 1206, the computing device 112 determines whether a next lowest pixel remains within the current column. In response to the computing device 112 determining that a next lowest pixel so remains, the operation returns from the step 1206 to the step 1202, with such next lowest pixel being the current pixel. In the example of FIG. 9, if the current column is the rightmost column, and if the pixel $P_{39}$ is the current pixel, then the pixel $P_{29}$ remains as a next lowest pixel within the current column.

Referring again to the step 1204, in response to the computing device 112 determining that the current pixel's respective probability (within the object probability map O) exceeds the percentage threshold, the operation continues from the step 1204 to a step 1208. At the step 1208, the computing device 112 determines whether all of the next N consecutive pixels immediately above the current pixel have respective probabilities (within the object probability map O) that exceed the percentage threshold. In the example of FIG. 9, if N=5, and if the current column is the rightmost column, and if the pixel $P_{89}$ is the current pixel, then the pixels $P_{39}$, $P_{49}$, $P_{59}$, $P_{69}$ and $P_{79}$ are the next N consecutive pixels immediately above the current pixel.

In response to the computing device 112 determining that at least one of the next N consecutive pixels has a respective probability (within the object probability map O) that fails to exceed the percentage threshold, the operation continues from the step 1208 to the step 1206. Conversely, in response to the computing device 112 determining that all of the next N consecutive pixels immediately above the current pixel have respective probabilities (within the object probability map O) that exceed the percentage threshold, the operation continues from the step 1208 to a step 1210. At the step 1210, the computing device 112 marks the current pixel as a respective bottom B of the nearest detected object in the current column.

After the step 1210, the operation continues to a step 1212, at which the computing device 112 determines whether a next column remains to have its respective bottom B marked. In response to the computing device 112 determining that a next column so remains, the operation returns from the step 1212 to the step 1202, with such next column being the current column, and with such next column's lowest pixel being the current pixel. Conversely, in response to the computing device 112 determining (at the step 1212) that a next column does not so remain, the operation of FIG. 12 ends.

Referring again to the step 1202, in response to the computing device 112 determining that the current pixel is located less than N pixels below the horizon line, the operation continues from the step 1202 to a step 1214. At the step 1214, the computing device 112 marks the current column's respective bottom B as being a null value. After the step 1214, the operation continues to the step 1212. Similarly, referring again to the step 1206, in response to the computing device 112 determining that a next lowest pixel does not remain within the current column, the operation continues from the step 1206 to the step 1214.

Referring again to FIG. 4, after the step 412, the operation continues to a next step 414. At the step 414, per column of the object probability map O ("current column"), the computing device 112 estimates a respective disparity C of such column's nearest detected object. Accordingly, the disparity C is a 1D array whose size equals a width of the object probability map O.

Figure 13:
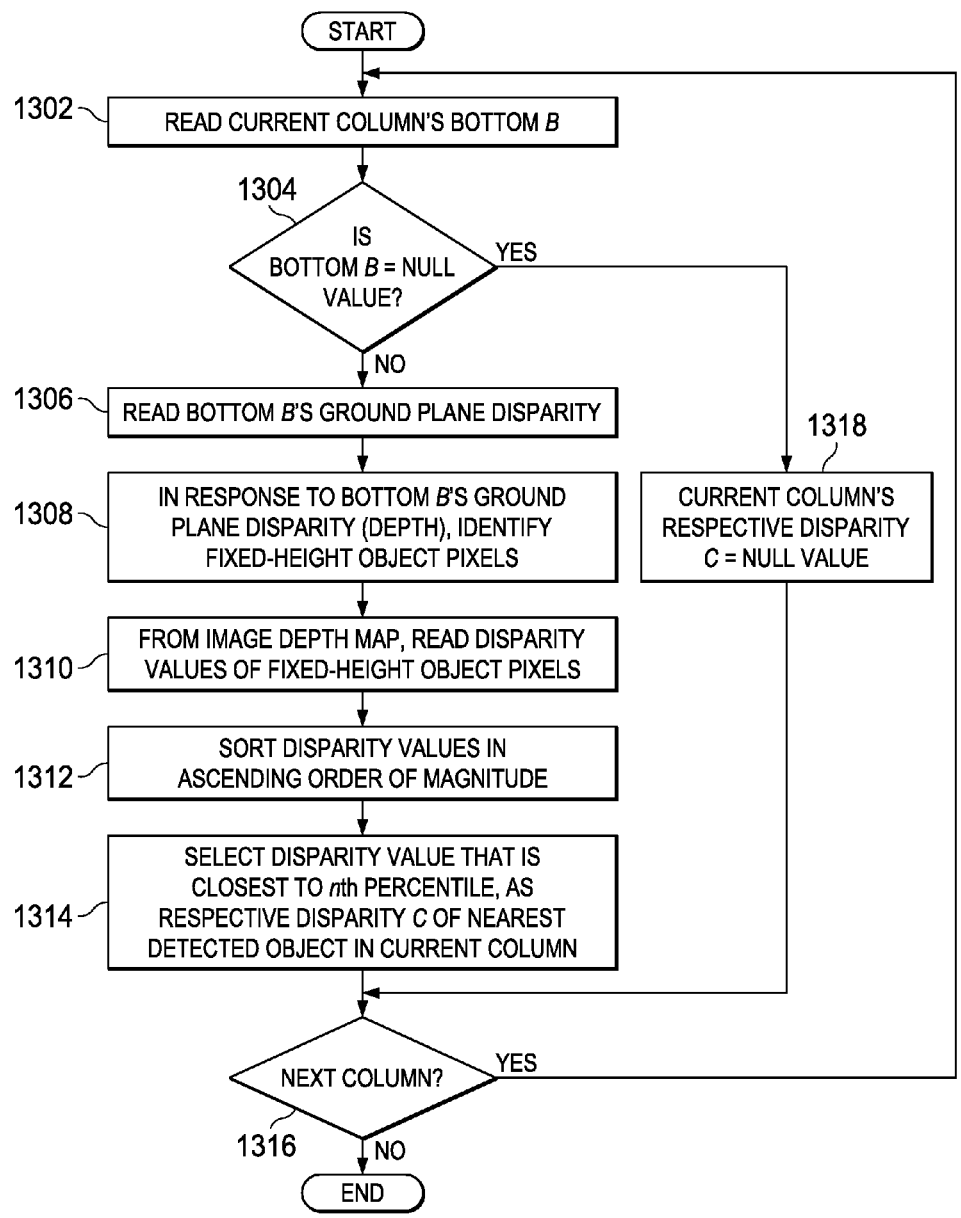
FIG. 13 is a flowchart of an operation that the computing device of FIG. 1 automatically performs for estimating a disparity of the nearest detected fixed-height object per column of the image depth map.

FIG. 13 is a flowchart of the step 414 (FIG. 4) for estimating the disparity C. At a step 1302, the computing device 112 reads the current column's respective bottom B ("current bottom B"). At a next step 1304, the computing device 112 determines whether the current bottom B is a null value. In response to the computing device 112 determining that the current bottom B is other than a null value, the operation continues from the step 1304 to a step 1306, at which the computing device 112 reads the current bottom B's respective ground plane disparity from among the stored ground plane disparities 712.

The current bottom B's respective ground plane disparity is proportional to the current bottom B's respective depth within the ground plane. At a next step 1308, the computing device 112 identifies all pixels ("fixed-height object pixels") that would exist within a representative object ("fixed-height object") that: (a) has the fixed-height (e.g., 1.0 meter) at such depth in the physical universe; and (b) within the current column, extends vertically upward from the current bottom B, so that the current bottom B is the bottom pixel of the fixed-height object. The fixed-height is programmable or selectable, according to a minimum height of objects that are relevant in a particular environment.

In the example of FIG. 9, if a pixel $P_{88}$ is the current bottom B, then its respective ground plane disparity indicates that the fixed-height object contains pixels $P_{38}$, $P_{48}$, $P_{58}$, $P_{68}$, $P_{78}$ and $P_{88}$. FIG. 11 shows a top T of the fixed-height object per column of the example object probability map O of FIG. 8. Accordingly, the top T is a 1D array whose size equals a width of the object probability map O.

At a next step 1310, from the image depth map, the computing device 112 reads the respective disparity values of the fixed-height object pixels. At a next step 1312, the computing device 112 generates a list that sorts those disparity values in their ascending order of magnitude, so that such list: (a) starts with the smallest one of those disparity values; and (b) ends with the largest one of those disparity values. At a next step 1314, from among those sorted disparity values, the computing device 112 selects the disparity value that is closest to the nth percentile, where n is programmable or selectable according to a percentile that is relevant in a particular environment.

For example, if such list sorts ten (10) disparity values, and if n=20, then the computing device 112 selects the second disparity value from within such list. The selected disparity value is the respective disparity C of the nearest detected object in the current column. Accordingly, in response to a column's respective disparity C, the computing device 112 estimates a respective depth of the nearest detected object in such column.

After the step 1314, the operation continues to a step 1316, at which the computing device 112 determines whether a next column remains to have its respective disparity C selected. In response to the computing device 112 determining that a next column so remains, the operation returns from the step 1316 to the step 1302, with such next column being the current column. Conversely, in response to the computing device 112 determining (at the step 1316) that a next column does not so remain, the operation of FIG. 13 ends.

Referring again to the step 1304, in response to the computing device 112 determining that the current bottom B is a null value, the operation continues from the step 1304 to a step 1318. At the step 1318, the computing device 112 marks the current column's respective disparity C as being a null value. After the step 1318, the operation continues to the step 1316.

Referring again to FIG. 4, after the step 414, the operation continues to a next step 416. At the step 416, the computing device 112 initially detects objects in response to the disparity C array, as discussed hereinbelow in connection with FIG. 15. At a next step 418, the computing device 112 enhances accuracy in identifying locations of those detected objects, as discussed hereinbelow in connection with FIG. 17. After the step 418, the various operations of FIG. 4 end.

Figure 14:
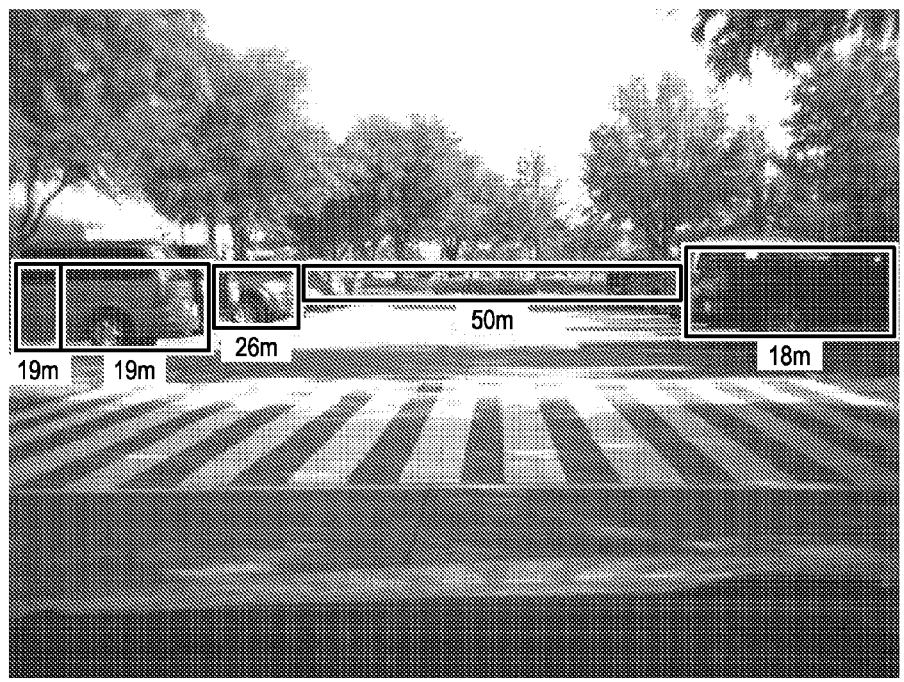
FIG. 14 is the first example image of FIG. 5A with additional lines for showing objects that the computing device of FIG. 1 initially detects.

FIG. 14 is an example image of objects that the computing device 112 initially detects at the step 416. Optionally, to the display device 114, the computing device 112 outputs such image, together with various boxes and numerical labels that the computing device 112 overlays within such image, so that the display device 114 displays such image (including such boxes and labels) for viewing by the user 116. The boxes outline the detected objects, and the numerical labels identify respective average depths of the detected objects within the boxes.

For each detected object in the example of FIG. 14, the computing device 112: (a) in response to such object's average depth, identifies a row on the ground plane at such depth, according to the ground plane equation M; and (b) vertically positions such object's box within the image, so that a bottom of such box is positioned on such row within the image, which makes the bottom of such box appear to rest on the ground plane at such depth.

In the example of FIG. 14, the boxes have a fixed-height of 1.5 meters at their respective average depths in the physical universe. For example, at a shallower (e.g., more proximate to the camera 104) depth, a box's vertical dimension becomes larger to contain more pixels, because the fixed-height would appear larger within the image at the shallower depth in the physical universe. Conversely, at a deeper (e.g., more distant from the camera 104) depth, the box's vertical dimension becomes smaller to contain fewer pixels, because the fixed-height would appear smaller within the image at the deeper depth in the physical universe.

Figure 15:
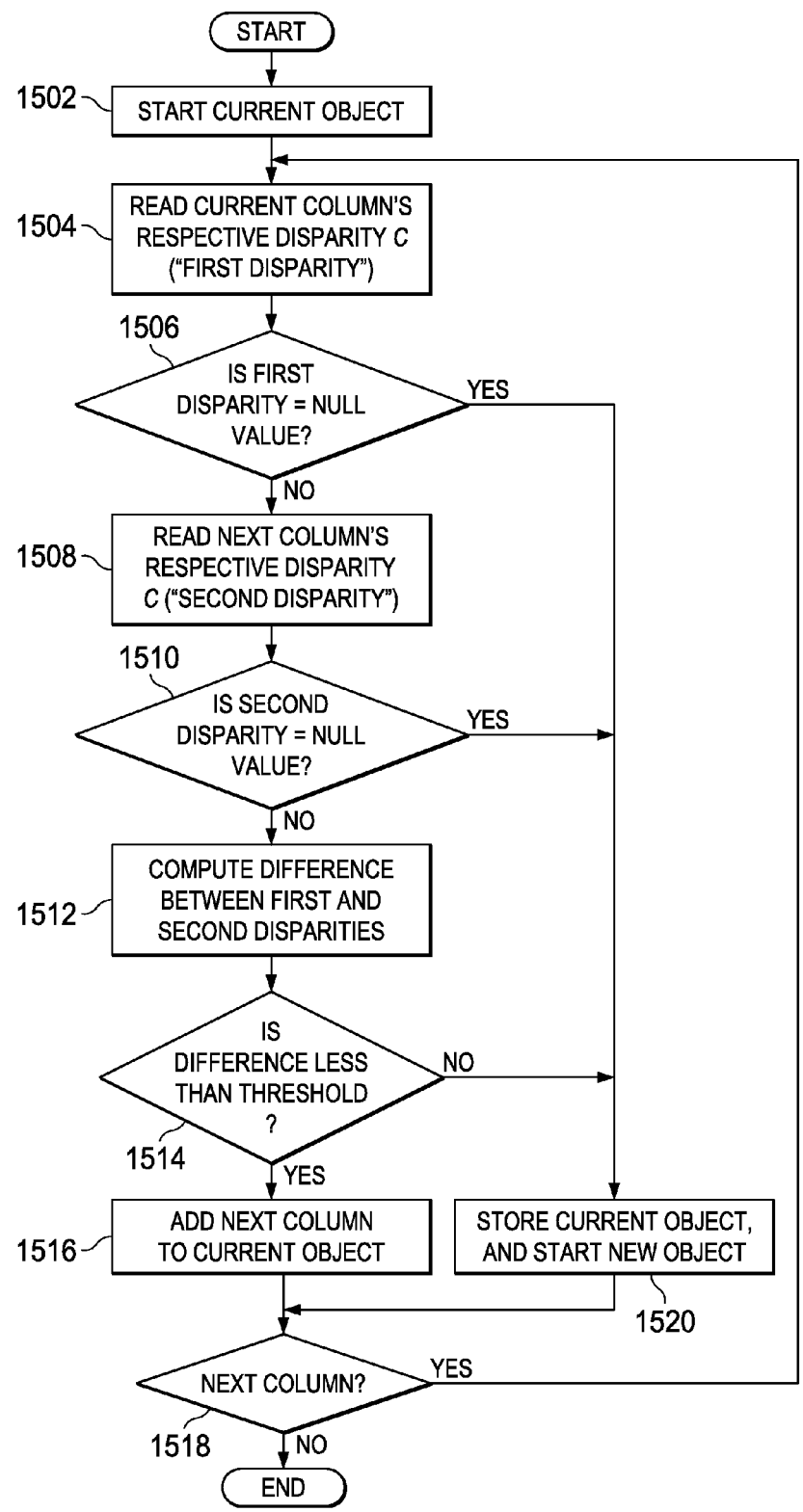
FIG. 15 is a flowchart of an operation that the computing device of FIG. 1 automatically performs for initially detecting objects in response to the estimated disparities of FIG. 13.

FIG. 15 is a flowchart of the step 416 (FIG. 4) for initially detecting objects in response to the disparity C array. For the step 416, the computing device 112 initially reviews the image depth map's leftmost column as the current column. At a step 1502, the computing device 112 starts (e.g., instantiates) a current object that includes the current column.

At a next step 1504, the computing device 112 reads the current column's respective disparity C ("first disparity"). At a next step 1506, the computing device 112 determines whether the first disparity is a null value. In response to the computing device 112 determining that the first disparity is other than a null value, the operation continues from the step 1506 to a step 1508.

At the step 1508, the computing device 112 reads the next column's respective disparity C ("second disparity"). At a next step 1510, the computing device 112 determines whether the second disparity is a null value. In response to the computing device 112 determining that the second disparity is other than a null value, the operation continues from the step 1510 to a step 1512.

At the step 1512, the computing device 112 computes a difference between the first and second disparities. At a next step 1514, the computing device 112 determines whether such difference is less than a threshold difference. In response to the computing device 112 determining that such difference is less than the threshold difference, the operation continues from the step 1514 to a step 1516. The threshold difference is programmable or selectable, according to types and sizes of objects that are relevant in a particular environment.

At the step 1516, the computing device 112 adds the next column to the current object, so that the current object includes the next column. At a next step 1518, the computing device 112 determines whether the next column is the last column. In response to the computing device 112 determining that the next column is not the last column, the operation returns from the step 1518 to the step 1504, with the next column being the current column.

Referring again to the steps 1506, 1510 and 1514, in response to the computing device 112 determining that the first disparity is a null value, or that the second disparity is a null value, or that such difference is greater than or equal to the threshold difference, the operation continues to a step 1520. At the step 1520, the computing device 112: (a) stores the current object as being complete; and (b) starts a new object that includes the next column. After the step 1520, the operation continues to the step 1518, with the new object being the current object. At the step 1518, in response to the computing device 112 determining that the next column is the last column, the operation of FIG. 15 ends.

After the operation of FIG. 15 ends, the computing device 112 finishes the step 416 by: (a) identifying objects that include more than a threshold number of columns per object, so that those identified objects are the detected objects; (b) for each detected object, computing an average of its columns' respective disparity C values, which is such object's average depth; (c) overlaying various boxes and numerical labels within such image, so that the boxes outline the detected objects, and so that the numerical labels identify respective average depths of the detected objects within the boxes; and (d) optionally, outputting such image to the display device 114, so that the display device 114 displays such image (including such boxes and labels) for viewing by the user 116, as shown in the example of FIG. 14. The threshold number of columns per object is programmable or selectable, according to types and sizes of objects that are relevant in a particular environment.

Figure 16:
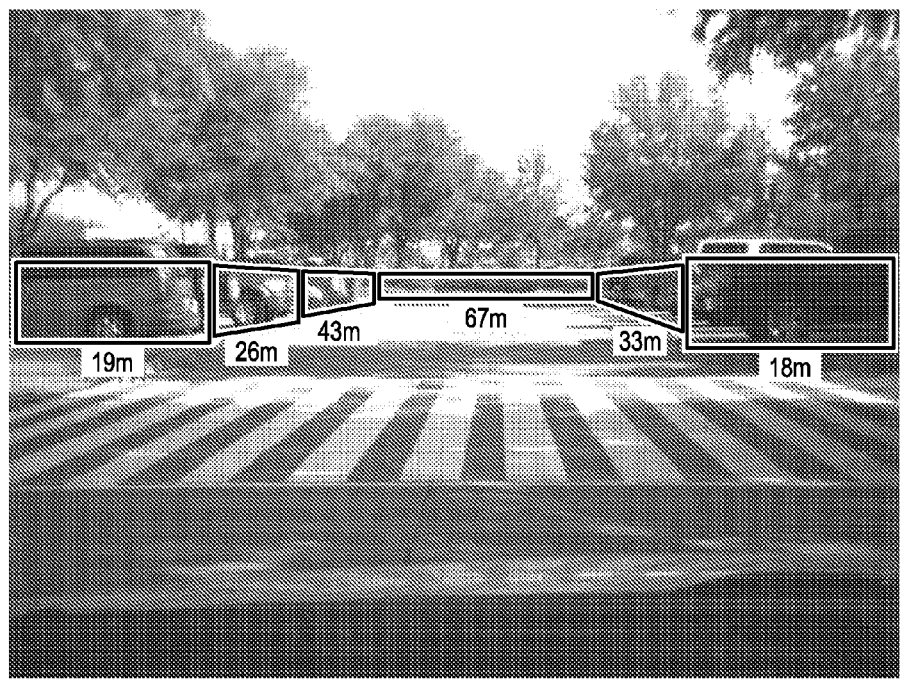
FIG. 16 is the first example image of FIG. 5A with additional lines for showing detected objects after the computing device of FIG. 1 enhances accuracy in identifying locations of those detected objects.

FIG. 16 is the example image of FIG. 14 that shows detected objects after the computing device 112 (at the step 418) enhances accuracy in identifying locations of those detected objects. For each detected object, by performing a RANSAC operation, the computing device 112 fits a 2-parameter equation $C_k$ to the respective disparity C values of such object's columns. In response to a column's position $x_k$ along a horizontal x-axis within such object, the computing device 112 uses such object's respective equation $C_k$ for computing such object's disparity $d_k$ at such column, so that $d_k = \text{Offset}_k + a_k \cdot x_k$ for such object, where: (a) $\text{Offset}_k$ is the respective disparity C of such object's leftmost column; (b) $a_k$ is a constant per-column disparity rate along the horizontal x-axis; and (c) a total number of the detected objects is K, so that the detected objects are sequentially numbered as k=1 through K.

Figure 17:
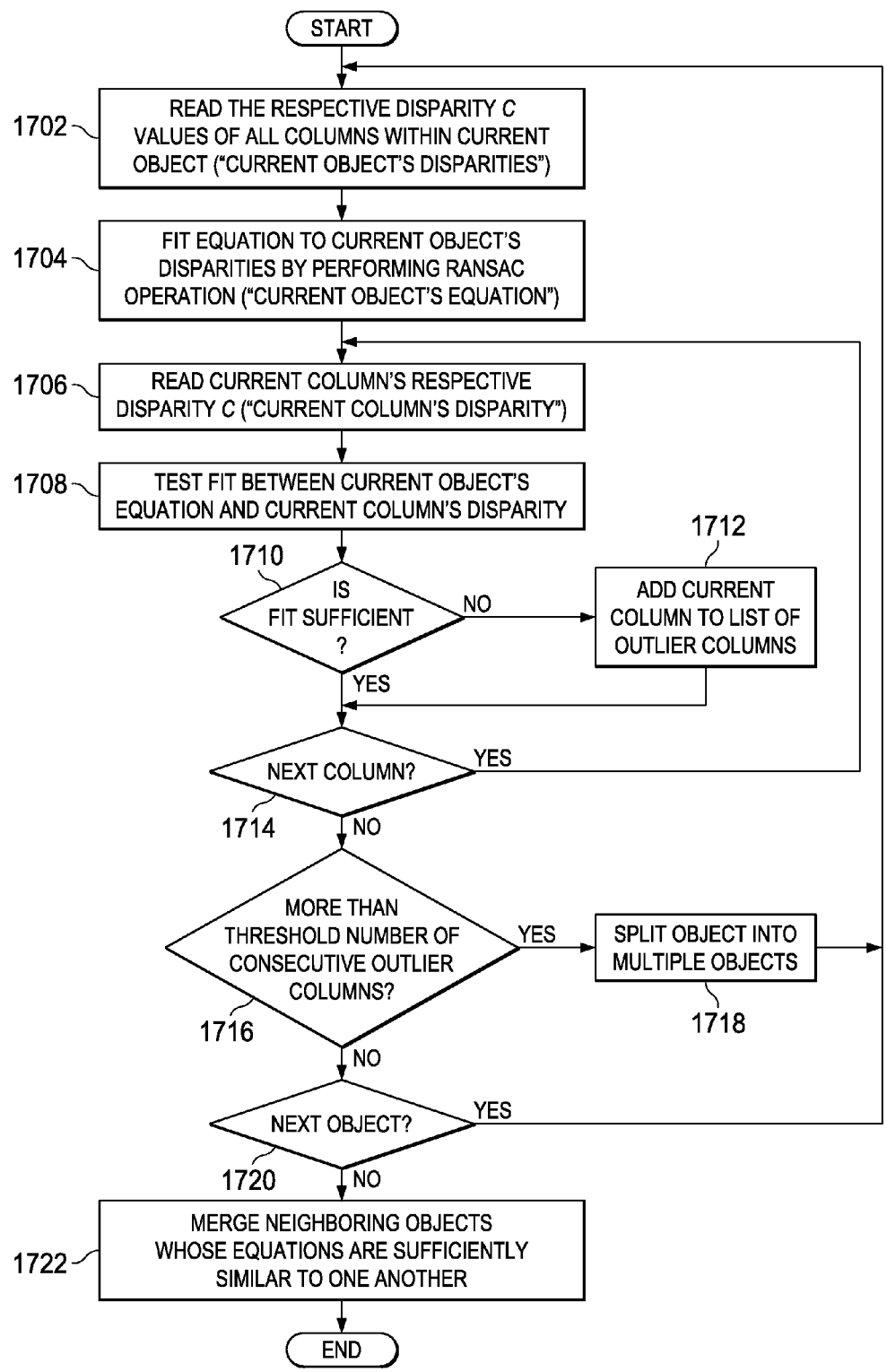
FIG. 17 is a flowchart of an operation that the computing device of FIG. 1 automatically performs for enhancing accuracy in identifying locations of those detected objects.

FIG. 17 is a flowchart of the step 418 (FIG. 4) for enhancing accuracy in identifying locations of each detected object ("current object"). At a step 1702, the computing device 112 reads the respective disparity C values of the current object's columns ("current object's disparities"). At a next step 1704, the computing device 112 fits a respective 2-parameter linear equation $C_k$ to the current object's disparities by performing a RANSAC operation ("current object's equation").

The computing device 112 initially reviews the current object's leftmost column as the current column. At a next step 1706, the computing device 112 reads the current column's respective disparity C ("current column's disparity"). At a next step 1708, the computing device 112 tests a fit between the current object's equation and the current column's disparity, such as by computing a difference between: (a) the current column's disparity; and (b) a disparity that the computing device 112 computes (for the current column) in response to the current object's equation.

At a next step 1710, the computing device 112 determines whether the fit (tested at the step 1708) is sufficient, such as by determining whether such difference exceeds a threshold that is programmable or selectable (e.g., according to types and sizes of objects that are relevant in a particular environment). In response to the computing device 112 determining that the fit is insufficient, the operation continues from the step 1710 to a step 1712. Conversely, in response to the computing device 112 determining that the fit is sufficient, the operation continues from the step 1710 to a step 1714. At the step 1712, the computing device 112 adds the current column to a list of outlier columns. After the step 1712, the operation continues to the step 1714.

At the step 1714, the computing device 112 determines whether a next column remains (within the current object) to have its respective disparity C tested against the current object's equation. In response to the computing device 112 determining that a next column so remains, the operation returns from the step 1714 to the step 1706, with such next column being the current column. Conversely, in response to the computing device 112 determining that a next column does not so remain, the operation continues from the step 1714 to a step 1716.

At the step 1716, the computing device 112 determines whether the current object includes more than a threshold number of consecutive outlier columns. The threshold number is programmable or selectable, according to types and sizes of objects that are relevant in a particular environment. In response to the computing device 112 determining that the current object includes more than the threshold number of consecutive outlier columns, the operation continues from the step 1716 to a step 1718.

At the step 1718, the computing device 112 splits the current object into multiple objects, so that: (a) any group (exceeding the threshold number) of consecutive outlier columns becomes a new object; and (b) any remaining group of consecutive columns becomes yet another new object. For example, if the current object includes columns 0, 1, 2, 3, 4, 5, 6, 7, 8 and 9, and if the columns 3, 4, 5 and 6 form a group (exceeding the threshold number) of consecutive outlier columns, then: (a) a first new object includes the columns, 3, 4, 5 and 6; (b) a second new object includes the columns 0, 1 and 2; and (c) a third new object includes the columns 7, 8 and 9. In another example, if the columns 0, 1, 2 and 3 form a first group (exceeding the threshold number) of consecutive outlier columns, and if the columns 7, 8 and 9 form a second group (exceeding the threshold number) of consecutive outlier columns, then: (a) a first new object includes the columns 0, 1, 2 and 3; (b) a second new object includes the columns 7, 8 and 9; and (c) a third new object includes the columns 4, 5 and 6.

After the step 1718, the operation returns to the step 1702, with one of the new objects being the current object. Referring again to the step 1716, in response to the computing device 112 determining that the current object does not include more than the threshold number of consecutive outlier columns, the operation continues from the step 1716 to a step 1720. At the step 1720, the computing device 112 determines whether a next object remains to have its respective 2-parameter equation $C_k$ fitted and tested.

In response to the computing device 112 determining that a next object so remains, the operation returns from the step 1720 to the step 1702, with such next object being the current object. Conversely, in response to the computing device 112 determining that a next object does not so remain, the operation continues from the step 1720 to a step 1722. At the step 1722, the computing device 112 merges neighboring (e.g., adjacent) objects whose respective equations $C_k$ are sufficiently similar to one another, based upon a level of sufficient similarity that is programmable or selectable (e.g., according to types and sizes of objects that are relevant in a particular environment).

For example, if a rightmost column of a first object is adjacent to a leftmost column of a second object, then the computing device 112 computes: (a) a first disparity of such rightmost column in response to the first object's respective equation $C_k$; and (b) a second disparity of such leftmost column in response to the second object's respective equation $C_k$. If the first and second disparities are sufficiently similar to one another (e.g., within a threshold difference from one another), and if the constant factor $a_k$ of the first object's respective equation $C_k$ is sufficiently similar to (e.g., within a threshold difference from) the constant factor $a_k$ of the second object's respective equation $C_k$, then the computing device 112: (a) merges the first and second objects to become a new object; (b) reads the respective disparity C values of the new object's columns ("new object's disparities"); and (c) fits a new respective equation $C_k$ to the new object's disparities by performing a RANSAC operation.

After the step 1722, the operation of FIG. 17 ends. After the operation of FIG. 17 ends, the computing device 112 finishes the step 418 by: (a) identifying objects that include more than a threshold number of columns per object, so that those identified objects are the detected objects; (b) for each detected object, computing such object's various depths in response to such object's respective equation $C_k$; (c) in response to such object's various depths, identifying one or more rows on the ground plane at such various depths, according to the ground plane equation M; (d) for such object, overlaying a box that is vertically positioned and suitably oriented within such image, so that the box outlines such object, and so that a bottom of such box is positioned on such one or more rows within the image, which makes the bottom of such box appear to rest on the ground plane at such various depths; (e) for such object, overlaying a numerical label within such image, so that the numerical label identifies a respective average depth of such object within the box; and (f) optionally, outputting such image to the display device 114, so that the display device 114 displays such image (including each detected object's respective box and label) for viewing by the user 116, as shown in the example of FIG. 16. The threshold number of columns per object is programmable or selectable, according to types and sizes of objects that are relevant in a particular environment.

Figure 18A:
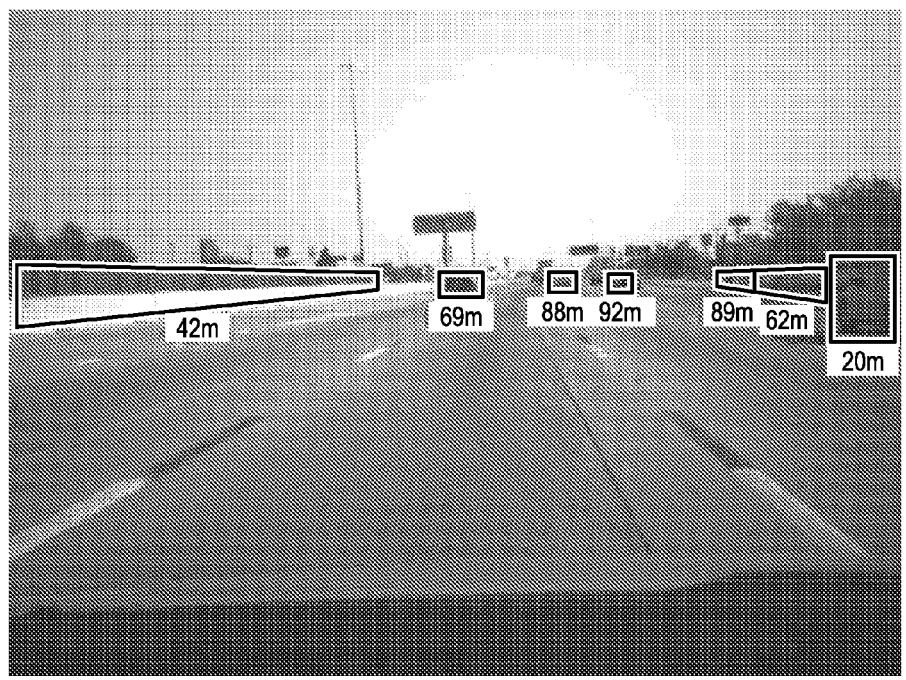
FIG. 18A is a second example image from a stereo pair of images with additional lines for showing objects that the computing device of FIG. 1 detects and locates.
Figure 18B:
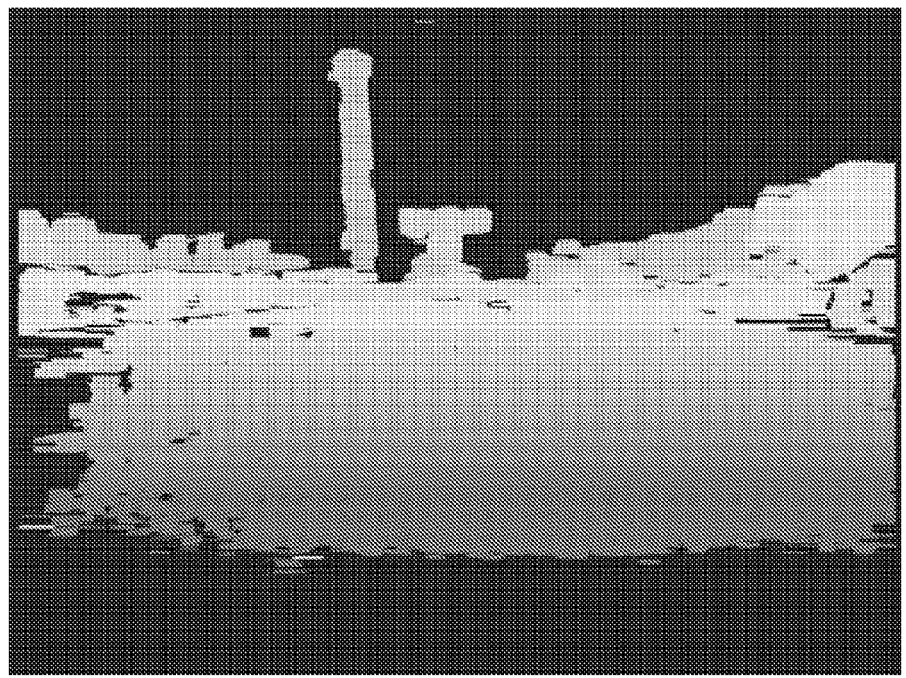
FIG. 18B is an example depth map of the image of FIG. 18A.
Figure 19A:
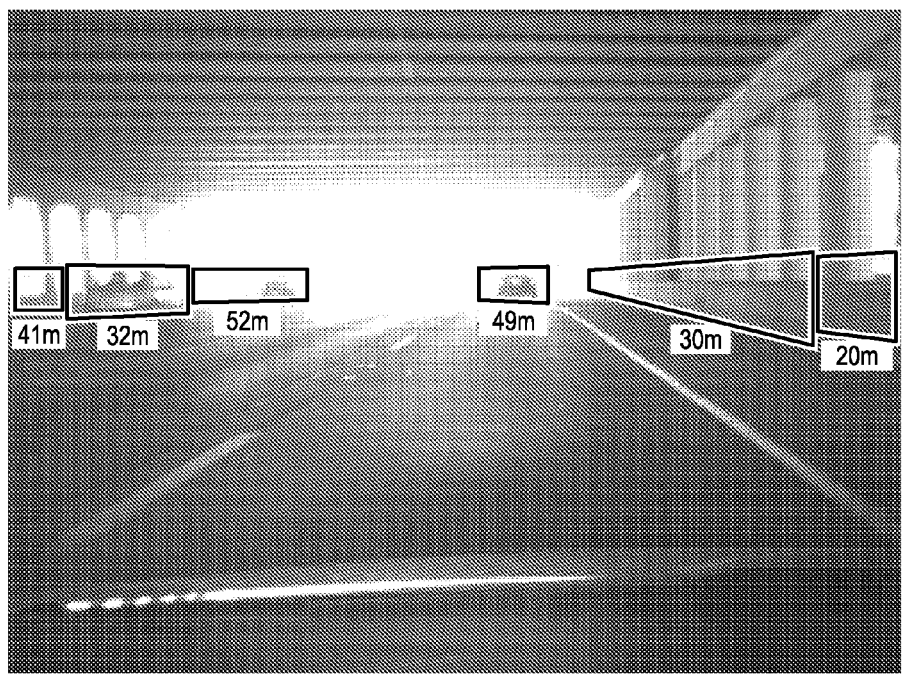
FIG. 19A is a third example image from a stereo pair of images with additional lines for showing objects that the computing device of FIG. 1 detects and locates.
Figure 19B:
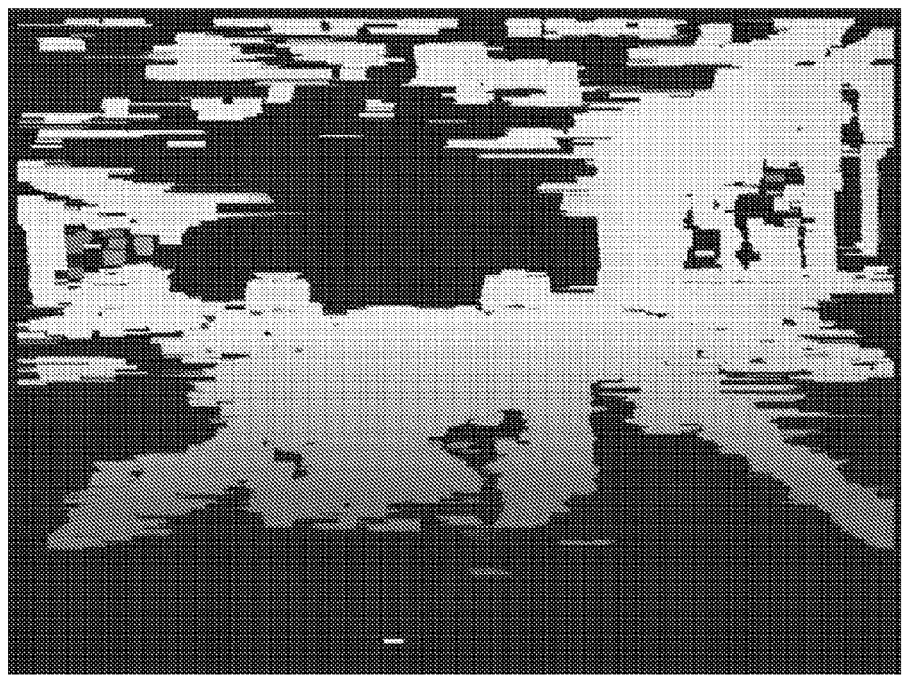
FIG. 19B is an example depth map of the image of FIG. 19A.
Figure 20A:
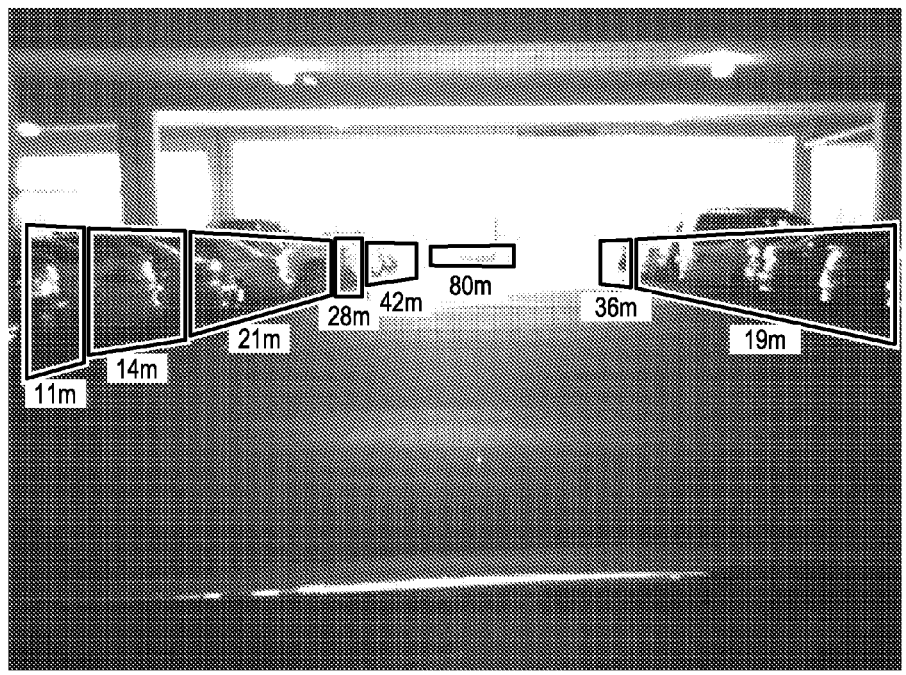
FIG. 20A is a fourth example image from a stereo pair of images with additional lines for showing objects that the computing device of FIG. 1 detects and locates.
Figure 20B:
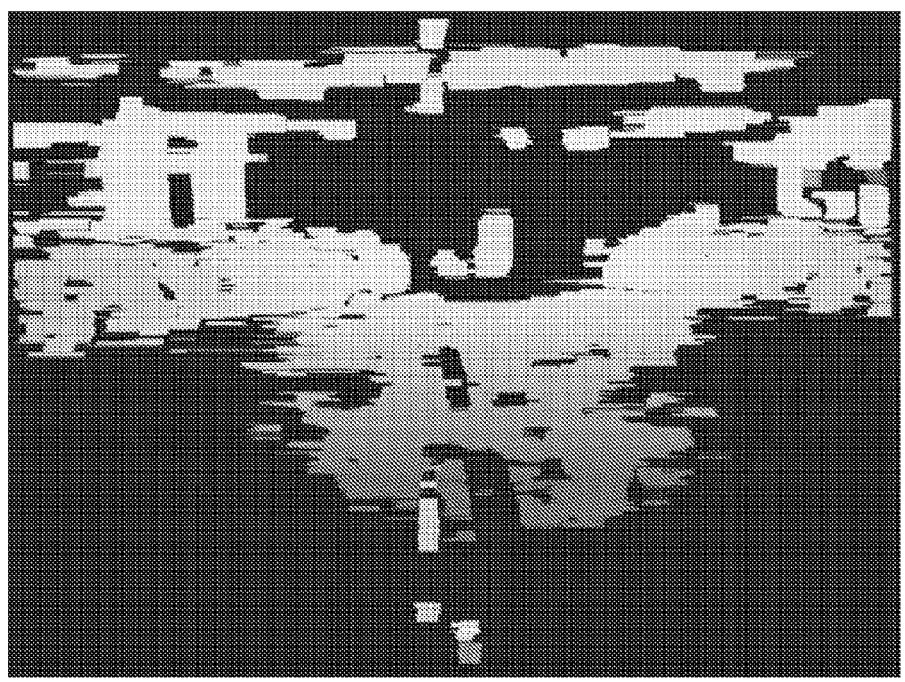
FIG. 20B is an example depth map of the image of FIG. 20A.
Figure 21A:
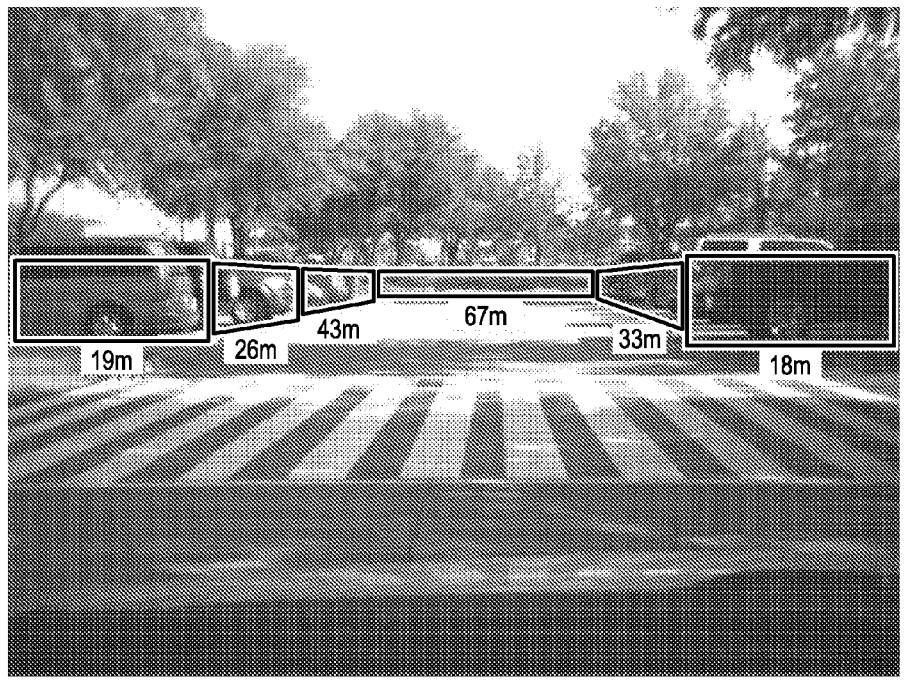
FIG. 21A is a fifth example image from a stereo pair of images with additional lines for showing objects that the computing device of FIG. 1 detects and locates.
Figure 21B:
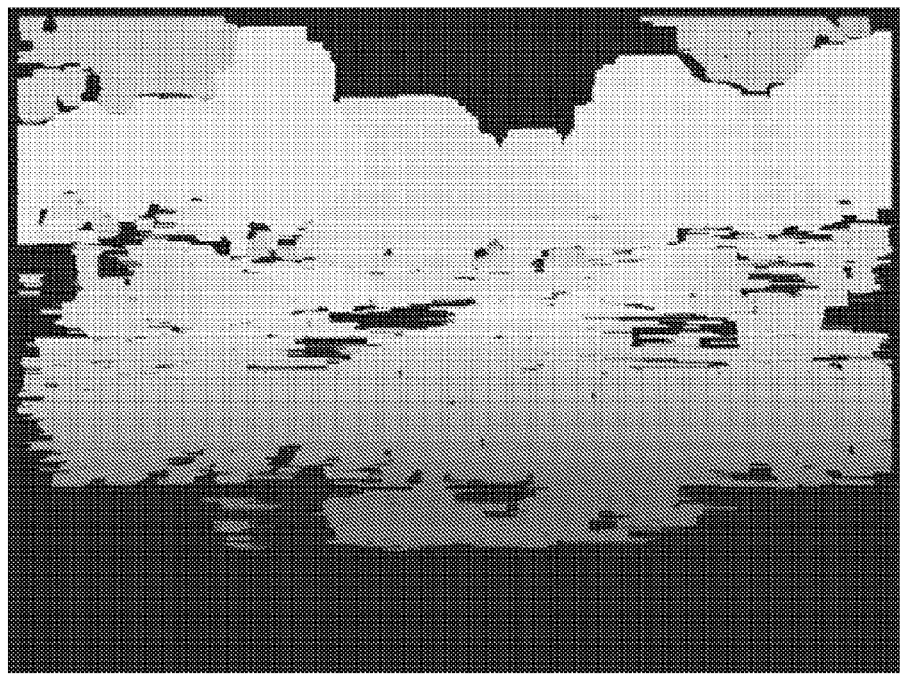
FIG. 21B is an example depth map of the image of FIG. 21A.
Figure 22A:
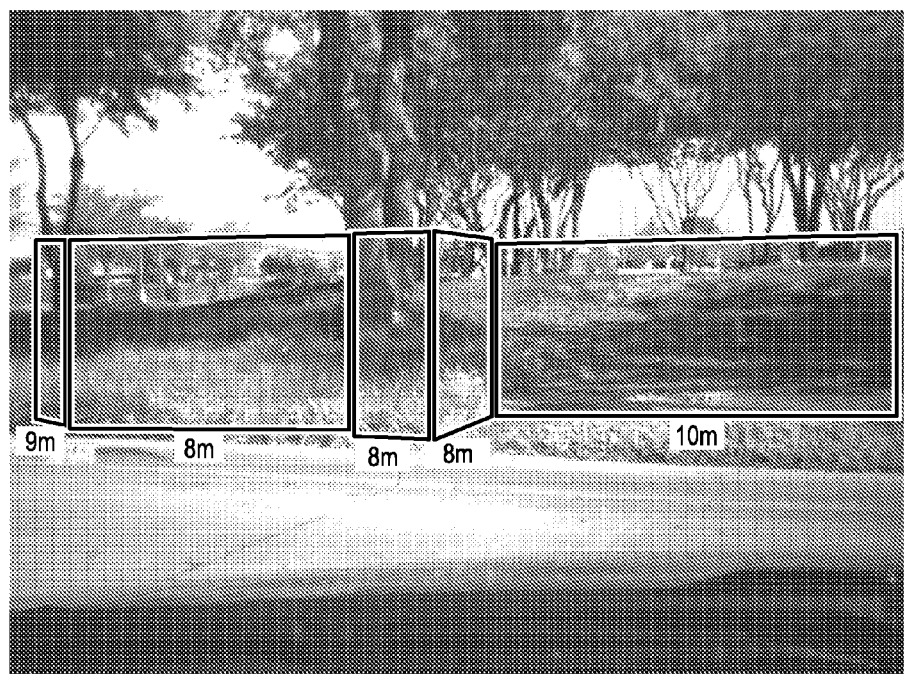
FIG. 22A is a sixth example image from a stereo pair of images with additional lines for showing objects that the computing device of FIG. 1 detects and locates.
Figure 22B:
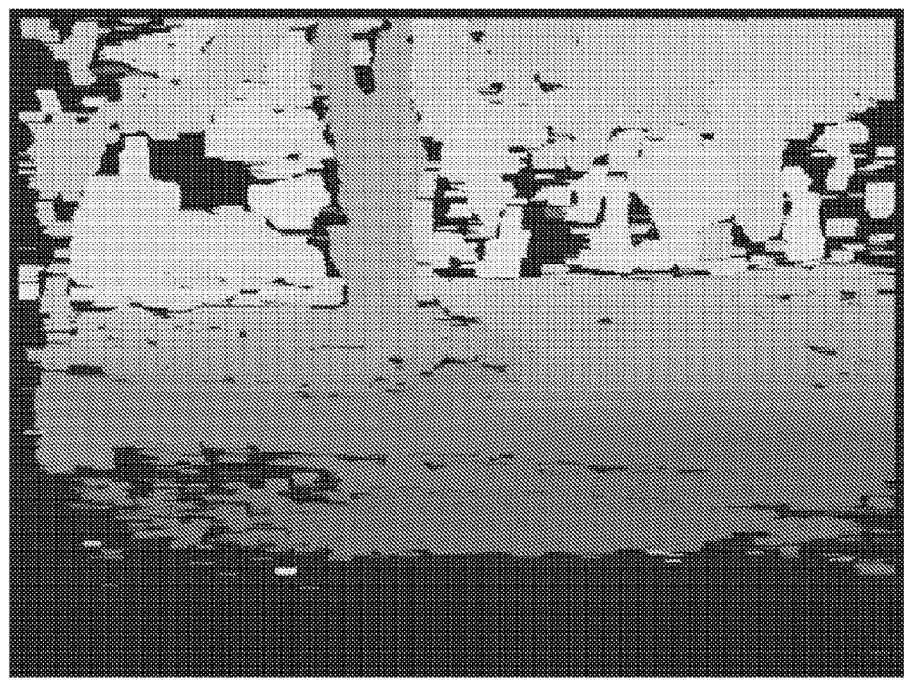
FIG. 22B is an example depth map of the image of FIG. 22A.
Figure 23A:
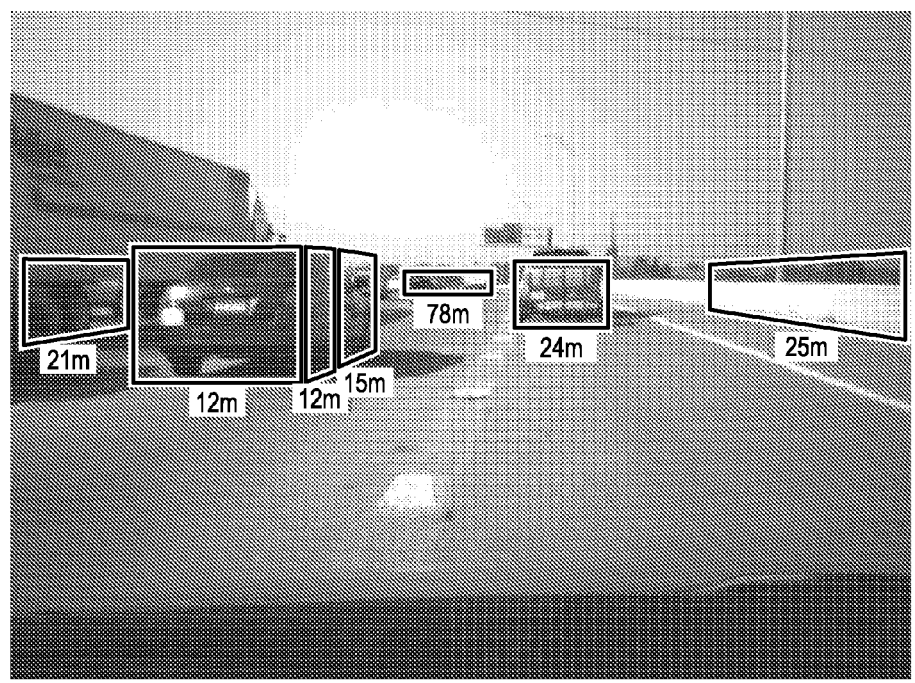
FIG. 23A is a seventh example image from a stereo pair of images with additional lines for showing objects that the computing device of FIG. 1 detects and locates.
Figure 23B:
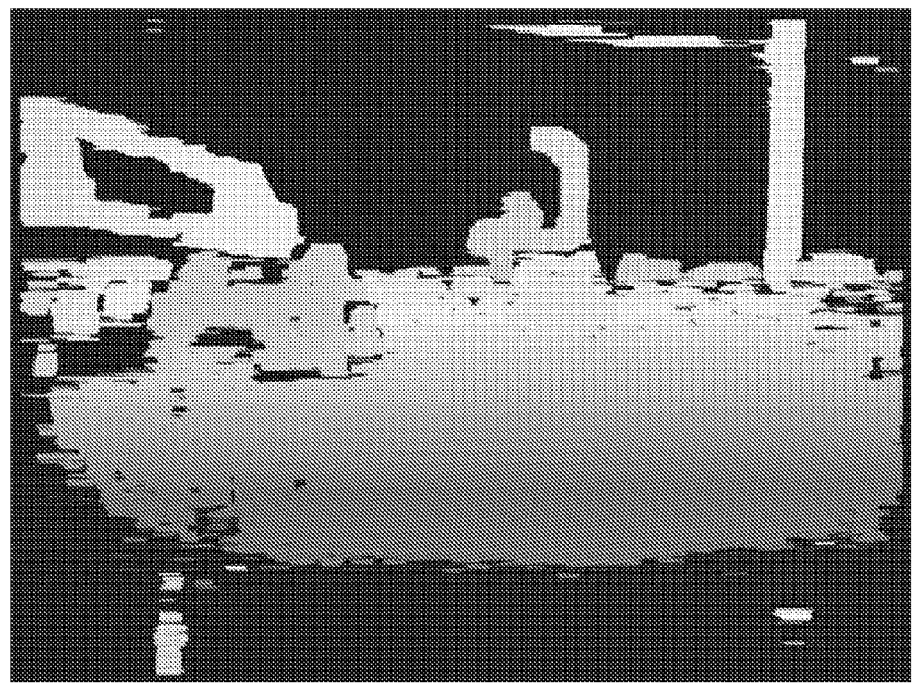
FIG. 23B is an example depth map of the image of FIG. 23A.

FIGS. 18A through 20B show various types of objects that the computing device 112 detects and locates at relatively near (shallow) and far (deep) proximities to the camera 104. FIGS. 18A, 19A and 20A show various scenes and results of such detection and location, in response to the image depth maps of FIGS. 18B, 19B and 20B, respectively. FIGS. 21A through 23B show various types of objects that the computing device 112 detects and locates at relatively near proximities to the camera 104. FIGS. 21A, 22A and 23A show various scenes and results of such detection and location, in response to the image depth maps of FIGS. 21B, 22B and 23B, respectively. The image depth maps may be imperfect.

Various implementations (e.g., automotive implementations) of the system 100 are operable to perform additional operations (e.g., machine vision operations) in response to such detection and location. Examples of those additional operations include automatic cruise control, driver warning, emergency braking, traffic sign recognition, surveillance, and location estimation. The computing device 112 performs such detection and location in a computationally efficient manner, even in response to imperfect images (e.g., with noisy and/or missing pixels) from a low-complexity stereoscopic camera.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for enhancing accuracy in identifying locations of detected objects within an image, the method comprising:
   detecting a first object within the image, wherein the first object includes pixel columns;
   fitting an equation to respective depths of the pixel columns, and determining whether a fit is sufficient between the equation and the respective depths of the pixel columns; and
   in response to determining that the fit is insufficient between the equation and more than a threshold number of the respective depths of consecutive pixel columns, splitting the first object into at least second and third objects, wherein the second object includes the consecutive pixel columns.

2. The method of claim 1, wherein the image is a stereoscopic image, and comprising:
   in response to the stereoscopic image, generating a depth map that assigns respective disparity values to pixel coordinates within the stereoscopic image, wherein the respective disparity values are indicative of respective depths of the pixel coordinates within the stereoscopic image; and
   in response to the respective disparity values, estimating the respective depths of the pixel columns.

3. The method of claim 1, wherein the respective depths of the pixel columns are estimated depths, and wherein determining whether the fit is sufficient includes:
   in response to the equation, computing depths of the pixel columns; and
   comparing the estimated depths against the computed depths.

4. The method of claim 3, wherein the comparing includes: determining whether a threshold is exceeded by differences between the estimated depths and the computed depths.

5. The method of claim 1, wherein the respective depths of the pixel columns are estimated depths of nearest detected objects in the pixel columns, and wherein the first object is a merger of the nearest detected objects.

6. A method performed by at least one device for enhancing accuracy in identifying locations of detected objects within an image, the method comprising:
   detecting first and second objects within the image, wherein the first object includes first pixel columns, wherein the second object includes second pixel columns, and wherein a rightmost one of the first pixel columns is adjacent to a leftmost one of the second pixel columns;
   fitting a first equation to respective depths of the first pixel columns, and computing a first depth of the rightmost one of the first pixel columns in response to the first equation;
   fitting a second equation to respective depths of the second pixel columns, and computing a second depth of the leftmost one of the second pixel columns in response to the second equation; and
   merging the first and second objects in response to the first and second depths being sufficiently similar to one another, and in response to the first and second equations being sufficiently similar to one another.

7. The method of claim 6, wherein the image is a stereoscopic image, and comprising:
   in response to the stereoscopic image, generating a depth map that assigns respective disparity values to pixel coordinates within the stereoscopic image, wherein the respective disparity values are indicative of respective depths of the pixel coordinates within the stereoscopic image; and
   in response to the respective disparity values, estimating the respective depths of the first pixel columns and of the second pixel columns.

8. The method of claim 6, wherein the merging includes: determining whether the first and second depths are sufficiently similar to one another by determining whether a threshold is exceeded by a difference between the first and second depths.

9. The method of claim 8, wherein the threshold is a first threshold, and wherein the merging includes: determining whether the first and second equations are sufficiently similar to one another by determining whether a second threshold is exceeded by a difference between a constant factor of the first equation and a constant factor of the second equation.

10. The method of claim 9, wherein the first and second equations are linear equations.

11. A system for enhancing accuracy in identifying locations of detected objects within an image, the system comprising:
    at least one device for: detecting a first object within the image, wherein the first object includes pixel columns; fitting an equation to respective depths of the pixel columns, and determining whether a fit is sufficient between the equation and the respective depths of the pixel columns; and, in response to determining that the fit is insufficient between the equation and more than a threshold number of the respective depths of consecutive pixel columns, splitting the first object into at least second and third objects, wherein the second object includes the consecutive pixel columns.

12. The system of claim 11, wherein the image is a stereoscopic image, and wherein the at least one device is for: in response to the stereoscopic image, generating a depth map that assigns respective disparity values to pixel coordinates within the stereoscopic image, wherein the respective disparity values are indicative of respective depths of the pixel coordinates within the stereoscopic image; and, in response to the respective disparity values, estimating the respective depths of the pixel columns.

13. The system of claim 11, wherein the respective depths of the pixel columns are estimated depths, and wherein determining whether the fit is sufficient includes:
in response to the equation, computing depths of the pixel columns; and
comparing the estimated depths against the computed depths.

14. The system of claim 13, wherein the comparing includes: determining whether a threshold is exceeded by differences between the estimated depths and the computed depths.

15. The system of claim 11, wherein the respective depths of the pixel columns are estimated depths of nearest detected objects in the pixel columns, and wherein the first object is a merger of the nearest detected objects.

16. A system for enhancing accuracy in identifying locations of detected objects within an image, the system comprising:
at least one device for: detecting first and second objects within the image, wherein the first object includes first pixel columns, wherein the second object includes second pixel columns, and wherein a rightmost one of the first pixel columns is adjacent to a leftmost one of the second pixel columns; fitting a first equation to respective depths of the first pixel columns, and computing a first depth of the rightmost one of the first pixel columns in response to the first equation; fitting a second equation to respective depths of the second pixel columns, and computing a second depth of the leftmost one of the second pixel columns in response to the second equation; and merging the first and second objects in response to the first and second depths being sufficiently similar to one another, and in response to the first and second equations being sufficiently similar to one another.

17. The system of claim 16, wherein the image is a stereoscopic image, and wherein the at least one device is for: in response to the stereoscopic image, generating a depth map that assigns respective disparity values to pixel coordinates within the stereoscopic image, wherein the respective disparity values are indicative of respective depths of the pixel coordinates within the stereoscopic image; and, in response to the respective disparity values, estimating the respective depths of the first pixel columns and of the second pixel columns.

18. The system of claim 16, wherein the merging includes: determining whether the first and second depths are sufficiently similar to one another by determining whether a threshold is exceeded by a difference between the first and second depths.

19. The system of claim 18, wherein the threshold is a first threshold, and wherein the merging includes: determining whether the first and second equations are sufficiently similar to one another by determining whether a second threshold is exceeded by a difference between a constant factor of the first equation and a constant factor of the second equation.

20. The system of claim 19, wherein the first and second equations are linear equations.

21. A computer program product for enhancing accuracy in identifying locations of detected objects within an image, the computer program product comprising:
a tangible computer-readable storage medium; and
a computer-readable program stored on the tangible computer-readable storage medium, wherein the computer-readable program is processable by an information handling system for causing the information handling system to perform operations including: detecting a first object within the image, wherein the first object includes pixel columns; fitting an equation to respective depths of the pixel columns, and determining whether a fit is sufficient between the equation and the respective depths of the pixel columns; and, in response to determining that the fit is insufficient between the equation and more than a threshold number of the respective depths of consecutive pixel columns, splitting the first object into at least second and third objects, wherein the second object includes the consecutive pixel columns.

22. The computer program product of claim 21, wherein the image is a stereoscopic image, and wherein the operations include: in response to the stereoscopic image, generating a depth map that assigns respective disparity values to pixel coordinates within the stereoscopic image, wherein the respective disparity values are indicative of respective depths of the pixel coordinates within the stereoscopic image; and, in response to the respective disparity values, estimating the respective depths of the pixel columns.

23. The computer program product of claim 21, wherein the respective depths of the pixel columns are estimated depths, and wherein determining whether the fit is sufficient includes:
in response to the equation, computing depths of the pixel columns; and
comparing the estimated depths against the computed depths.

24. The computer program product of claim 23, wherein the comparing includes: determining whether a threshold is exceeded by differences between the estimated depths and the computed depths.

25. The computer program product of claim 21, wherein the respective depths of the pixel columns are estimated depths of nearest detected objects in the pixel columns, and wherein the first object is a merger of the nearest detected objects.

26. A computer program product for enhancing accuracy in identifying locations of detected objects within an image, the computer program product comprising:
a tangible computer-readable storage medium; and
a computer-readable program stored on the tangible computer-readable storage medium, wherein the computer-readable program is processable by an information handling system for causing the information handling system to perform operations including: detecting first and second objects within the image, wherein the first object includes first pixel columns, wherein the second object includes second pixel columns, and wherein a rightmost one of the first pixel columns is adjacent to a leftmost one of the second pixel columns; fitting a first equation to respective depths of the first pixel columns, and computing a first depth of the rightmost one of the first pixel columns in response to the first equation; fitting a second equation to respective depths of the second pixel columns, and computing a second depth of the leftmost one of the second pixel columns in response to the second equation; and merging the first and second objects in response to the first and second depths being sufficiently similar to one another, and in response to the first and second equations being sufficiently similar to one another.

27. The computer program product of claim 26, wherein the image is a stereoscopic image, and wherein the operations include: in response to the stereoscopic image, generating a depth map that assigns respective disparity values to pixel coordinates within the stereoscopic image, wherein the respective disparity values are indicative of respective depths of the pixel coordinates within the stereoscopic image; and, in response to the respective disparity values, estimating the respective depths of the first pixel columns and of the second pixel columns.

28. The computer program product of claim 26, wherein the merging includes: determining whether the first and second depths are sufficiently similar to one another by determining whether a threshold is exceeded by a difference between the first and second depths.

29. The computer program product of claim 28, wherein the threshold is a first threshold, and wherein the merging includes: determining whether the first and second equations are sufficiently similar to one another by determining whether a second threshold is exceeded by a difference between a constant factor of the first equation and a constant factor of the second equation.

30. The computer program product of claim 29, wherein the first and second equations are linear equations.

* * * * *